(12) United States Patent
Kasahara et al.

(10) Patent No.: US 7,446,815 B2
(45) Date of Patent: *Nov. 4, 2008

(54) IMAGE CONVERSION DEVICE AND IMAGE CONVERSION METHOD

(75) Inventors: Mitsuhiro Kasahara, Hirakata (JP); Tomoaki Daigi, Takatsuki (JP); Hideaki Kawamura, Moriyama (JP); Hideto Nakahigashi, Takatsuki (JP); Tomoko Morita, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 567 days.

This patent is subject to a terminal disclaimer.

(21) Appl. No.: 10/509,677

(22) PCT Filed: Apr. 14, 2003

(86) PCT No.: PCT/JP03/04721

§ 371 (c)(1),
(2), (4) Date: Oct. 8, 2004

(87) PCT Pub. No.: WO03/088660

PCT Pub. Date: Oct. 23, 2003

(65) Prior Publication Data
US 2005/0140825 A1 Jun. 30, 2005

(30) Foreign Application Priority Data
Apr. 17, 2002 (JP) ............................ 2002-114569
Apr. 10, 2003 (JP) ............................ 2003-107140

(51) Int. Cl.
*H04N 7/01* (2006.01)
*H04N 11/20* (2006.01)

(52) U.S. Cl. ........................ 348/448; 348/441; 348/452; 348/701

(58) Field of Classification Search .................. 348/448, 348/441, 452, 459, 700, 701; 382/299, 300; H04N 7/01, H04N 11/20
See application file for complete search history.

(56) References Cited

U.S. PATENT DOCUMENTS
4,785,351 A 11/1988 Ishikawa
(Continued)

FOREIGN PATENT DOCUMENTS
JP 61-32681 2/1986
(Continued)

OTHER PUBLICATIONS
English language Abstract of JP 4-372292.
(Continued)

*Primary Examiner*—Trang U Tran
(74) *Attorney, Agent, or Firm*—Greenblum & Bernstein, P.L.C.

(57) ABSTRACT

A first video signal generation circuit newly generates pixels between pixels in a first progressive video field signal outputted by a first progressive video generation circuit, and outputs a third progressive video field signal. A second video signal generation circuit newly generates pixels between pixels in a second progressive video field signal outputted by a second progressive video generation circuit, and outputs a fourth progressive video field signal. A comparison circuit compares the third progressive video field signal and the fourth progressive video field signal, and outputs the result of the comparison as motion amount information. An output circuit synthesizes an intra-field interpolation signal and a frame interfiled interpolation signal on the basis of the motion amount information, and outputs a composite signal as a progressive video signal.

16 Claims, 17 Drawing Sheets

U.S. PATENT DOCUMENTS

| | | | |
|---|---|---|---|
| 4,992,869 A | 2/1991 | Samad et al. | |
| 5,619,273 A | 4/1997 | Sugiyama | |
| 6,288,745 B1 * | 9/2001 | Okuno et al. | 348/448 |
| 6,330,032 B1 | 12/2001 | Boehlke | |
| 6,340,990 B1 | 1/2002 | Wilson | |
| 6,606,126 B1 * | 8/2003 | Lim et al. | 348/452 |
| 6,728,317 B1 | 4/2004 | Demos | |
| 7,116,372 B2 * | 10/2006 | Kondo et al. | 348/448 |
| 2003/0011709 A1 | 1/2003 | Kasahara et al. | |
| 2004/0196901 A1 | 10/2004 | Demos | |

FOREIGN PATENT DOCUMENTS

| | | |
|---|---|---|
| JP | 62-128683 | 6/1987 |
| JP | 3-62692 | 3/1991 |
| JP | 4-372292 | 12/1992 |
| JP | 5-049013 | 2/1993 |
| JP | 8-130716 | 5/1996 |
| JP | 10-098692 | 4/1998 |
| JP | 10-112845 | 4/1998 |
| JP | 11-308577 | 11/1999 |
| JP | 2000-50212 | 2/2000 |
| JP | 2000-134585 | 5/2000 |
| WO | 99/51028 | 10/1999 |
| WO | 01/77871 | 10/2001 |

OTHER PUBLICATIONS

English language Abstract of JP 2000-134858.
English language Abstract of JP 2000-50212.
English language Abstract of JP 61-32681.
English language Abstract of JP 5-49013.
English language Abstract of JP 10-98692.
English language Abstract of JP 11-308577.
English language Abstract of JP 10-112845.
U.S. Appl. No. 10/509,679 to Kasahara et al.

* cited by examiner

IMAGE CONVERSION DEVICE AND IMAGE CONVERSION METHOD

TECHNICAL FIELD

The present invention relates to a picture conversion apparatus and a picture conversion method for converting an interlaced video signal into a progressive video signal.

BACKGROUND ART

In order to convert interlaced video signals into progressive video signals, motion adaptive progressive conversion apparatuses have been conventionally employed.

FIG. 14 illustrates an example of an interlaced video signal. An interlaced video signal in one frame is transmitted as a picture in two fields. For example, when L is an even value, signals on even-numbered lines such as the L-th line, the (L+2)-th line, the (L+4)-th line, the (L+6)-th line, and the (L+8)-th line are transmitted in the N-th field. Subsequently, signals on odd-numbered lines such as the (L+1)-th line, the (L+3)-th line, the (L+5)-th line, and the (L+7)-th line are transmitted in the (N+1)-th field. Further, signals on the same even-numbered lines as those in the N-th field are transmitted in the succeeding (N+2)-th field.

The interlaced video signal is thus transmitted in two fields, and a video in one frame is displayed by scanning lines in the two fields.

A signal on a line which is not transmitted in each of the fields is generated from signals on lines preceding and succeeding the field on a time basis or signals in the field (e.g., signals on upper and lower lines). The generated signal and the transmitted signal are synthesized, thereby generating a progressive video signal.

A line actually transmitted in a current field is hereinafter referred to as a current line, and a line generated from a plurality of fields preceding and succeeding the current field on a time basis or lines in the current field is hereinafter referred to as an interpolation line.

FIG. 15 illustrates an example of the configuration of the conventional motion adaptive progressive conversion apparatus. As shown in FIG. 15, the motion adaptive progressive conversion apparatus comprises one-field delay circuits J1 and J2, a motion detection circuit J3, an inter-frame interpolation circuit J4, an intra-field interpolation circuit J5, and a switching circuit J6. An interlaced video signal J0 is delayed by one field by each of the one-field delay circuit J1 and the one-field delay circuit J2.

The motion detection circuit J3 compares corresponding pixels on the same line in a given field and a field which is two fields preceding or succeeding the field on a time basis (hereinafter referred to as "between frames"). The motion detection circuit J3 judges, when the difference between the values of the compared pixels is small, that the pixel is a "still picture", while judging, when the difference between the values of the compared pixels is large, that the pixel is a "moving picture".

The inter-frame interpolation circuit J4 generates, from the pixels on the same line between frames, the corresponding pixels. For example, when a pixel X on the (L+4)-th line in the (N+1)-th field is interpolated in FIG. 14, the inter-frame interpolation circuit J4 generates the pixel X by an operation "X=(A+B)/2" (A and B indicate the brightness levels of signals representing pixels), for example, from a pixel A on the (L+4)-th line in the N-th field and a pixel B on the (L+4)-th line in the (N+2)-th field.

The intra-field interpolation circuit J5 generates, from pixels on adjacent lines in the same field, the corresponding pixels. For example, when the pixel X on the (L+4)-th line in the (N+1)-th field is interpolated in FIG. 14, the intra-field interpolation circuit J5 generates the pixel X by an operation "X=(C+D)/2" (C and D indicate the brightness levels of signals representing pixels), for example, from a pixel C on the (L+3)-th line in the (N+1)-th field and a pixel D on the (L+5)-th line in the (N+1)-th field.

The switching circuit J6 selects, when an output of the one-field delay circuit J1 is a signal on a current line, the signal on the current line and outputs the selected signal as a progressive video signal J7. The switching circuit J6 outputs the signal fed from the inter-frame interpolation circuit J4 as the progressive video signal J7 when the motion detection circuit J3 judges that an object pixel is judged to be a "still picture", while outputting the signal fed from the intra-field interpolation circuit J5 as the progressive video signal J7 when the motion detection circuit J3 judges that an object pixel is a "moving picture".

In the apparatus having such a configuration, with respect to still pictures in frames between which there is a high correlation, a progressive video signal generated by inter-frame interpolation (interpolation performed from two fields preceding or succeeding a current field on a time basis) is outputted. On the other hand, with respect to moving pictures in frames between which there is a low correlation, a progressive video signal generated by intra-field interpolation is outputted. According to this method, therefore, interpolation processing almost conforming to the motion of a picture should be theoretically possible.

In the method as in the conventional example, however, when a picture having a large luminance difference in the vertical direction moves slowly, accurate judgment cannot be made. Therefore, inter-frame interpolation processing suitable for the still picture and intra-field interpolation processing suitable for the moving picture cannot be satisfactorily performed, so that the picture may, in some cases, be degraded.

An example in such a case is illustrated as follows. FIG. 16 illustrates an original video signal which has not been converted yet into an interlaced video signal. The video signal changes in the degree of brightness (luminance) in a sine wave manner. The vertical axis indicates the luminance, and the horizontal axis indicates the number of a line. The luminance of black is indicated as the minimum value "0", and the luminance of white is indicated as the maximum value "255". Numerical values in FIG. 16 respectively indicate sampled values.

The luminance of the original video signal is a value "218" on the L-th line, is the maximum value "255" between the L-th line and the (L+1)-th line, is a value "218" on the (L+1)-th line, is a value "128" between the (L+1)-th line and the (L+2)-th line, is a value "37" on the (L+2)-th line, is the minimum value "0" between the (L+2)-th line and the (L+3)-th line, is a value "37" on the (L+3)-th line, is a value "128" between the (L+3)-th line and the (L+4)-th line, and is a value "218" on the (L+4)-th line. Similarly, the luminance also changes on the (L+5)-th line and the subsequent lines. When this picture is transmitted as an interlaced video signal, it is as illustrated in FIG. 17. That is, the value of a solid circle is transmitted in a given field, and the value of an open circle is transmitted in the succeeding field.

FIG. 18 illustrates a superimposition of video signals obtained by shifting such an interlaced video signal a half line at a time for each field. That is, luminance values "218", "37", "218", and "37" are respectively transmitted as the L-th line, the (L+2)-th line, the (L+4)-th line, and the (L+6)-th line in the f1-th field.

Subsequently, the waveform of the original video signal is moved a half line at a time in the f2-th field. Therefore, luminance values "255", "0", "255", and "0" are respectively transmitted as the (L+1)-th line, the (L+3)-th line, the (L+5)-th line, and the (L+7)-th line. In the following, the luminance values of the video signals are respectively transmitted, as illustrated, in the f3-th field, the f4-th field, the f5-th field, and the f6-th field. The relationship between a line and a sampled value in each field is shown in

TABLE 1

Relationship between Line and Sampled Value in Each Field

|  | f1 | f2 | f3 | f4 | f5 | f6 |
|---|---|---|---|---|---|---|
| (a) Value of Original Video Signal |||||||
| L | 218 | 128 | 37 | 0 | 37 | 128 |
| L + 1 | 218 | 255 | 218 | 128 | 37 | 0 |
| L + 2 | 37 | 128 | 218 | 255 | 218 | 128 |
| L + 3 | 37 | 0 | 37 | 128 | 218 | 255 |
| L + 4 | 218 | 128 | 37 | 0 | 37 | 128 |
| L + 5 | 218 | 255 | 218 | 128 | 37 | 0 |
| L + 6 | 37 | 128 | 218 | 255 | 218 | 128 |
| L + 7 | 37 | 0 | 37 | 128 | 218 | 255 |
| (b) Value of Sampled Video Signal |||||||
| L | 218 | — | 37 | — | 37 | — |
| L + 1 | — | 255 | — | 128 | — | 0 |
| L + 2 | 37 | — | 218 | — | 218 | — |
| L + 3 | — | 0 | — | 128 | — | 255 |
| L + 4 | 218 | — | 37 | — | 37 | — |
| L + 5 | — | 255 | — | 128 | — | 0 |
| L + 6 | 37 | — | 218 | — | 218 | — |
| L + 7 | — | 0 | — | 128 | — | 255 |

Table 1 (a) shows the luminance value of an original video signal which has not been sampled yet as an interlaced video signal in each of fields, and Table 1 (b) shows the luminance value of a video signal which has already been sampled as an interlaced video signal. On the side of a receiver which has received the interlaced video signal, a luminance value on a line on which the interlaced video signal is not subjected to interpolation signal processing and transmitted, that is, in a column shown with "minus mark" in Table 1 (b) is found, so that the interlaced video signal is converted into a progressive video signal.

Description is made of operations in a case where such an interlaced video signal is processed by the conventional motion adaptive progressive conversion apparatus shown in FIG. 15. In the conventional motion adaptive progressive conversion apparatus, the motion detection circuit J3 judges whether an object pixel is a "still picture" or a "moving picture" by the difference between the luminance value of an interlaced video signal in a given field and the luminance value of an interlaced video signal in a field which is two fields succeeding or preceding the field on a time basis. The result of the judgment is sent to the switching circuit J6.

The switching circuit J6 outputs the signal fed from the inter-frame interpolation circuit J4 as the progressive video signal J7 if the motion detection circuit J3 judges that the object pixel is a "still picture", while outputting the signal fed from the intra-field interpolation circuit J5 as the progressive video signal J7 if the motion detection circuit J3 judges that the object pixel is a "moving picture".

The operations of the motion detection circuit J3 will be first described using Table 2 (a) and Table 2 (b).

TABLE 2

Table for Explaining Operation of Motion Detection Circuit

|  | f1 | f2 | f3 | f4 | f5 | f6 |
|---|---|---|---|---|---|---|
| (a) Difference in Value between Two Fields |||||||
| L | — | 181 | — | 0 | — | — |
| L + 1 | — | — | 127 | — | 128 | — |
| L + 2 | — | 181 | — | 0 | — | — |
| L + 3 | — | — | 128 | — | 127 | — |
| L + 4 | — | 181 | — | 0 | — | — |
| L + 5 | — | — | 127 | — | 128 | — |
| L + 6 | — | 181 | — | 0 | — | — |
| L + 7 | — | — | 128 | — | 127 | — |
| (b) Results of Judgment by Motion Detection Circuit |||||||
| L | — | Moving Picture | — | Still Picture | — | — |
| L + 1 | — | — | Moving Picture | — | Moving Picture | — |
| L + 2 | — | Moving Picture | — | Still Picture | — | — |
| L + 3 | — | — | Moving Picture | — | Moving Picture | — |
| L + 4 | — | Moving Picture | — | Still Picture | — | — |
| L + 5 | — | — | Moving Picture | — | Moving Picture | — |
| L + 6 | — | Moving Picture | — | Still Picture | — | — |
| L + 7 | — | — | Moving Picture | — | Moving Picture | — |

Table 2 (a) shows the difference between the luminance value of an interlaced video signal in a given field and the luminance value of an interlaced video signal in a field which is two fields succeeding or preceding the field. Values shown in Table 2 (a) are operated by the motion detection circuit J3. For example, the luminance value on the L-th line in the f2-th field is a value "181" which is the difference between the value "218" on the L-th line in the f1-th field and the value "37" on the L-th line in the f3-th field. Similarly, the luminance value on each of the lines in each of the fields is operated.

Table 2 (b) shows the results of judgment by the motion detection circuit J3 whether an object pixel is a "moving picture" or a "still picture" on the basis of the luminance value shown in Table 2 (a). Here, a threshold value of luminance between the moving picture and the still picture is taken as a value "20". The motion detection circuit J3 judges that the object pixel is a "moving picture" when the luminance value thereof is not less than the threshold value "20", while judging that the object pixel is a "still picture" when the luminance value thereof is not more than the threshold value "19".

The operations of the inter-frame interpolation circuit J4 and the intra-field interpolation circuit J5 will be then described.

TABLE 3

Output Value of Interpolation Circuit

|  | f1 | f2 | f3 | f4 | f5 | f6 |
|---|---|---|---|---|---|---|
| (a) Output Value of Inter-frame Interpolation Circuit |||||||
| L | — | 128 | — | 37 | — | — |
| L + 1 | — | — | 191 | — | 64 | — |
| L + 2 | — | 128 | — | 128 | — | — |
| L + 3 | — | — | 64 | — | 191 | — |
| L + 4 | — | 128 | — | 37 | — | — |
| L + 5 | — | — | 191 | — | 64 | — |
| L + 6 | — | 128 | — | 218 | — | — |
| L + 7 | — | — | 64 | — | 191 | — |

TABLE 3-continued

Output Value of Interpolation Circuit

| | f1 | f2 | f3 | f4 | f5 | f6 |
|---|---|---|---|---|---|---|
| (b) Output Value of Intra-field Interpolation Circuit | | | | | | |
| L | | | | | | |
| L + 1 | 128 | — | 128 | — | 128 | — |
| L + 2 | — | 128 | — | 128 | — | 128 |
| L + 3 | 128 | — | 128 | — | 128 | — |
| L + 4 | — | 128 | — | 128 | — | 128 |
| L + 5 | 128 | — | 128 | — | 128 | — |
| L + 6 | — | 128 | — | 128 | — | 128 |
| L + 7 | | | | | | |

Table 3 (a) shows the output value of the inter-frame interpolation circuit J4. For example, on the L-th line in the f2-th field, the luminance value of the interlaced video signal is not actually transmitted but is found by interpolation signal processing between frames. Therefore, the luminance value on the L-th line in the f2-th field in the inter-frame interpolation circuit J4 is calculated by averaging the value "218" on the L-th line in the f1-th field and the value "37" on the L-th line in the f3-th field in Table 1 (b), that is, as "(218+37)/2=128". The other luminance value shown in Table 3 (a) is similarly calculated as an average of the respective luminance values between frames.

On the other hand, Table 3 (b) shows the output value of the intra-field interpolation circuit J5. When the luminance value on the (L+1)-th line in the f1-th field is found by interpolation processing between fields, for example, the luminance value is calculated by averaging the value "218" on the L-th line in the f1-th field and the value "37" on the (L+2)-th line in the same f1-th field in Table 1 (b), that is, as "(218+37)/2=128". The other luminance value shown in Table 3 (b) is similarly calculated as an average of the respective luminance values on the upper and lower lines in the field.

Description is now made of the operations of the switching circuit J6. A signal fed from the inter-frame interpolation circuit J4, a signal fed from the intra-field interpolation circuit J5, a signal on a current line, and a signal fed from the motion detection circuit J3 are fed to the switching circuit J6.

Table 4 shows the luminance value of the progressive video signal J7 outputted from the switching circuit J6.

TABLE 4

Output Value of Switching Circuit and Difference between Interpolation Signal and Original Signal (a) Output Value of Switching Circuit on Interpolation Circuit

| | f1 | f2 | f3 | f4 | f5 | f6 |
|---|---|---|---|---|---|---|
| L | | | | - | | |
| L+1 | | - | 128 | - | 128 | |
| L+2 | | 128 | - | 128 | - | |
| L+3 | | - | 128 | - | 128 | |
| L+4 | | 128 | - | 37 | - | |
| L+5 | | - | 128 | - | 128 | |
| L+6 | | 128 | - | 218 | - | |
| L+7 | | | | | | |

(b) Difference between Interpolation Signal and Original Video Signal

| | f1 | f2 | f3 | f4 | f5 | f6 |
|---|---|---|---|---|---|---|
| L | | | | | | |
| L + 1 | | — | 90 | — | 90 | |
| L + 2 | | 0 | | 37 | | — |
| L + 3 | | — | 90 | — | 90 | |
| L + 4 | | 0 | | 37 | | — |
| L + 5 | | — | 90 | — | 90 | |
| L + 6 | | 0 | | 37 | | — |
| L + 7 | | | | | | |

Table 4 (a) shows results obtained by switching and outputting an inter-frame interpolation signal and an intra-field interpolation signal depending on the results of the judgment by the motion detection circuit J3 shown in Table 2 (b). The switching circuit J6 outputs the signal generated by the inter-frame interpolation circuit J4 if the motion detection circuit J3 judges that the object pixel is a "still picture", while outputting the signal generated by the intra-field interpolation circuit J5 if it judges that the object pixel is a "moving picture".

A hatched column in Table 4 (a) is a portion where the object pixel is judged to be a "moving picture". A column shown with "minus mark" in Table 4 (a) indicates that the interlaced video signal on the current line is outputted.

Table 4 (b) shows the difference between the luminance value of a signal outputted on an interpolation line and the luminance value of an original video signal which has not been interlaced yet in Table 1 (a). As can be seen from Table 4 (a), in the f3-th field and the f5-th field, the difference in luminance is a value "90", which is very large. The value "90" is too large, in contrast with a value "255" which is the maximum of the luminance values of the signals. In a progressive video signal obtained by progressive conversion, the large difference in luminance value becomes large noise, and the large noise is recognized as significant degradation in picture quality.

Thus, in the conventional motion adaptive progressive conversion apparatus, the motion detection circuit J3 easily judges that the object pixel is a "moving picture" when a picture slowly moves perpendicularly to the line direction, so that the picture quality thereof is liable to be degraded.

DISCLOSURE OF INVENTION

A picture conversion apparatus according to an aspect of the present invention is a picture conversion apparatus that converts an inputted interlaced video signal into a progressive video signal, comprising an interpolation circuit that generates interpolated pixels between lines on the basis of the inputted interlaced video signal; a motion calculation circuit that calculates a motion amount in the vertical direction of a picture on the basis of said interpolation signal outputted from the interpolation circuit; a motion calculation circuit that calculates a motion amount in the vertical direction of a picture on the basis of the interpolation signal outputted from the interpolation circuit; a still picture processing circuit that generates a still picture progressive signal by still picture processing from the inputted interlaced video signal; a moving picture processing circuit that generates a moving picture progressive signal by moving picture processing from the inputted interlaced video signal; and an output circuit that outputs the still picture progressive signal outputted from the still picture processing circuit as the progressive video signal when the motion amount in the vertical direction calculated by the motion calculation circuit is smaller than a first value.

In the picture conversion apparatus according to the present invention, the interlaced pixels between lines are generated by the interpolation circuit, and the interpolation signal including the interpolated pixels is outputted. The motion amount in the vertical direction of the picture is calculated by the motion calculation circuit on the basis of the outputted interpolation signal. Further, the still picture progressive signal is generated by the still picture processing by the still picture processing circuit from the inputted interlaced video signal, and the moving picture progressive signal is generated by the moving picture processing by the moving picture processing circuit from the inputted interlaced video signal. When the motion amount in the vertical direction calculated by the motion calculation circuit is smaller than the first value, the still picture progressive signal outputted by the still picture processing circuit is outputted as the progressive video signal from the output circuit.

Therefore, precise motion detection can be performed, thereby making it possible to generate a progressive video signal having a resolution whose picture quality is hardly degraded. As a result, accurate motion detection can be performed. Even when a picture having a large luminance difference in the vertical direction slowly moves, therefore, accurate motion judgment is made, thereby making it possible to convert the interlaced video signal into a progressive video which is stable and has a high resolution.

The interpolation circuit may include an interlace generation circuit that generates a plurality of interlaced video signals respectively corresponding to a plurality of successive fields on the basis of the inputted interlaced video signal, a progressive generation circuit that generates a progressive signal on the basis of the plurality of interlaced video signals generated by the interlace generation circuit and a pixel generation circuit that generates interpolated pixels between lines by interpolation processing using the progressive signal generated by the progressive generation circuit to output an interpolation signal including pixels in the progressive signal and the interpolated pixels. The motion calculation circuit may calculate the motion amount in the vertical direction of a picture on the basis of the interpolation signal outputted from the pixel generation.

In this case, the plurality of interlaced video signals respectively corresponding to the plurality of successive fields are generated by the interlace generation circuit on the basis of the inputted interlaced video signal, and the progressive signal is generated by the progressive generation circuit on the basis of the generated plurality of interlaced video signals. The interlaced pixels between lines are generated by the interpolation processing using the progressive signal generated by the pixel generation circuit, and the interpolation signal including the pixels in the progressive signal and the interpolated pixels is outputted. The motion amount in the vertical direction of the picture is calculated by the motion calculation circuit on the basis of the outputted interpolation signal.

Therefore, more precise motion detection can be performed, thereby making it possible to generate a progressive video signal having a high resolution whose picture quality is hardly degraded. As a result, accurate motion detection can be performed. Even when a picture having a large luminance difference in the vertical direction slowly moves, therefore, accurate motion judgment is made, thereby making it possible to convert the interlaced video signal into a progressive video which is stable and has a high resolution.

The first value may be a value which is not more than the spacing between lines. In this case, when the motion amount in the vertical direction calculated by the motion calculation circuit is not more than the spacing between lines, the still picture progressive signal is outputted as the progressive video signal. Even when a picture having a large luminance value in the vertical direction slowly moves, therefore, accurate motion judgment is made, thereby making it possible to convert the interlaced video signal into a progressive video which is stable and has a high resolution.

The motion calculation circuit may calculate the motion amount in the vertical direction on the basis of a value smaller than the spacing between lines. In this case, accurate motion detection can be performed. Even when a picture having a large luminance value in the vertical direction slowly moves, therefore, accurate motion judgment is made, thereby making it possible to convert the interlaced video signal into a progressive video signal which is stable and has a high resolution.

The progressive generation circuit may comprise a first progressive generation circuit that generates a first progressive signal on the basis of a first combination of more than one of the plurality of interlaced video signals generated by the interlace generation circuit, and a second progressive generation circuit that generates a second progressive signal on the basis of a second combination, which differs from the first combination, of more than one of the plurality of interlaced video signals generated by the interlace generation circuit. The pixel generation circuit may comprise a first pixel generation circuit that generates interpolated pixels between lines by interpolation processing using the first progressive signal generated by the first progressive generation circuit to output a first interpolation signal including the pixels in the first progressive signal and the interpolated pixels, and a second pixel generation circuit that generates interpolated pixels between lines by interpolation processing using the second progressive signal generated by the second progressive generation circuit, and outputs a second interpolation signal including the pixels in the second progressive signal and the interpolated pixels. The motion calculation circuit may calculate the motion amount on the basis of the first interpolation signal outputted from the first pixel generation circuit and the second interpolation signal outputted from the second pixel generation circuit.

In this case, the first progressive signal is generated on the basis of the first combination of more than one of the plurality of interlaced video signals by the first progressive generation circuit, and the second progressive signal is generated on the basis of the second combination of more than one of the plurality of interlaced video signals by the second progressive generation circuit.

Furthermore, the first interpolation signal including the pixels in the first progressive signal and the interpolated pixels is outputted by the first pixel generation circuit, and the second interpolation signal including the pixels in the second progressive signal and the interpolated pixels is outputted from the second pixel generation circuit. The motion amount is calculated from the first interpolation signal and the second interpolation signal by the motion calculation circuit.

When the interlaced signal is converted into the progressive video signal, therefore, it is possible to increase, in the vertical direction in which more strict conversion precision is required, the precision, and to omit a circuit for newly generating pixels in the horizontal direction. Accordingly, the increase in the circuit scale can be suppressed, thereby making it possible to convert the interlaced video signal into a high-precision progressive video signal at low cost.

The output circuit may output the moving picture progressive signal as the progressive video signal when the motion amount is larger than a second value. In this case, when the motion amount in the vertical direction calculated by the motion calculation circuit is larger than the second value, the moving picture progressive signal outputted by the moving picture processing circuit is outputted from the output circuit as the progressive video signal.

Even when a picture having a large luminance difference in the vertical direction slowly moves, therefore, accurate motion judgment is made, thereby making it possible to convert the interlaced video signal into a progressive video which is stable and has a high resolution.

The output circuit may synthesize, when the motion amount is between the first value and the second value, the moving picture progressive signal and the still picture progressive signal at a ratio based on the motion amount to output the synthesized signal as the progressive video signal.

In this case, the progressive video signal is generated from the moving picture progressive signal and the still picture progressive signal depending on the motion amount. Therefore, it is possible to generate a progressive video signal having a high resolution whose picture quality is hardly degraded.

The output circuit may set the ratio of the still picture progressive signal to not less than 0.5 when the motion amount is not more than the spacing between lines. In this case, the picture whose motion is large can be prevented from being erroneously operated, thereby making it possible to generate a progressive video signal whose picture quality is hardly degraded.

The output circuit may set the ratio of the still picture progressive signal to not less than 0.5 when the motion amount is not more than 0.75 times the spacing between lines. In this case, the picture whose motion is a little large can be prevented from being erroneously operated, thereby making it possible to generate a progressive video signal whose picture quality is hardly degraded.

The output circuit may set the ratio of the still picture progressive signal to not less than 0.5 when the motion amount is not more than 0.5 times the spacing between lines. In this case, the picture whose motion is small can be prevented from being erroneously operated, thereby making it possible to generate a progressive video signal whose picture quality is hardly degraded.

The plurality of interlaced video signals may include first to fourth interlaced video signals corresponding to successive first to fourth fields, the first combination of more than one of the plurality of interlaced video signals include the first to third interlaced video signals, and the second combination of more than one of the plurality of interlaced video signals include the second to fourth interlaced video signals.

In this case, more accurate motion detection can be performed. Even when a picture having a large luminance difference in the vertical direction slowly moves, accurate motion judgment can be made, thereby making it possible to provide a video which is stable and has a high resolution.

The picture conversion apparatus may further comprise a judgment circuit that respectively calculates the averages of the values of object pixels and pixels peripheral thereto in the plurality of interlaced video signals corresponding to the plurality of fields to judge whether the still picture progressive signal is adaptive or non-adaptive on the basis of the calculated averages. The output circuit may output the moving picture progressive signal as the progressive video signal when the result of the judgment by the judgment circuit is non-adaptive.

In this case, it is judged whether the still picture progressive signal is adaptive or non-adaptive by the judgment circuit on the basis of the average of the values of the object pixels and the pixels peripheral thereto in the plurality of interlaced video signals corresponding to the plurality of fields, and the moving picture progressive signal is outputted as the progressive video signal when the result of the judgment by the judgment circuit is non-adaptive.

Consequently, the picture having flicker properties, for example, the picture including successive flashing of a camera can be prevented from being erroneously still processed, thereby making it possible to generate a progressive video signal of a higher precision.

Furthermore, the non-adaptive region detection circuit detects the respective averages of the object pixels and the pixels peripheral thereto in the plurality of interlaced video signals corresponding to the plurality of fields. As a result, the circuit scale can be made relatively small.

The judgment circuit may respectively calculate the maximums and the minimums of the values of the object pixels and the pixels peripheral thereto in the plurality of interlaced video signals corresponding to the plurality of fields, and judge whether the still picture progressive signal is adaptive or non-adaptive on the basis of the calculated averages, maximums, and minimums.

In this case, it is judged whether the still picture progressive signal is adaptive or non-adaptive on the basis of the averages, maximums, and minimums of the values of the object pixels and the pixels peripheral thereto in the plurality of interlaced video signals corresponding to the plurality of fields. Consequently, it is more accurately judged whether the still picture progressive signal is adaptive or non-adaptive.

The judgment circuit may judge whether the still picture progressive signal to be non-adaptive when the respective differences between the calculated averages are larger than a predetermined value, and the difference between the maximum and the minimum in the same field is smaller than the predetermined value.

In this case, it is more accurately judged whether the still picture progressive signal is adaptive or non-adaptive.

A picture conversion method according to an aspect of the present invention is a picture conversion method in which an inputted interlaced video signal is converted into a progressive video signal, comprising the steps of generating interpolated pixels between lines, and outputting an interpolation signal including the interpolated pixels; calculating a motion amount in the vertical direction of a picture on the basis of the outputted interpolation signal; generating a still picture progressive signal by still picture processing from said inputted interlaced video signal; generating a moving picture progressive signal by moving picture processing from said inputted interlaced video signal; and outputting said outputted still picture progressive signal as said progressive video signal when the calculated motion amount in the vertical direction is smaller than a first value.

In the picture conversion method according to the present invention, the interlaced pixels between lines are generated, and the interpolation signal including the interpolated pixels is outputted. The motion amount in the vertical direction of the picture is calculated on the basis of the outputted interpolation signal. Further, the still picture progressive signal is generated by the still picture processing from the inputted interlaced video signal, and the moving picture progressive signal is generated by the moving picture processing from the inputted interlaced video signal. When the motion amount in the vertical direction calculated is smaller than the first value, the still picture progressive signal outputted is outputted as the progressive video signal from the output circuit.

Therefore, precise motion detection can be performed, thereby making it possible to generate a progressive video signal having a resolution whose picture quality is hardly degraded. As a result, accurate motion detection can be performed. Even when a picture having a large luminance difference in the vertical direction slowly moves, therefore, accurate motion judgment is made, thereby making it possible to convert the interlaced video signal into a progressive video signal which is stable and has a high resolution.

The step of generating interpolated pixels may include the step of generating a plurality of interlaced video signals respectively corresponding to a plurality of successive fields on the basis of the inputted interlaced video signal, generating a progressive signal on the basis of the generated plurality of interlaced video signals, generating interpolated pixels between lines by interpolation processing using the generated progressive signal, and outputting an interpolation signal including pixels in the progressive signal and the interpolated pixels. The step of calculating a motion amount may include the step of calculating the motion amount in the vertical direction of a picture on the basis of the outputted interpolation signal.

In this case, the plurality of interlaced video signals respectively corresponding to the plurality of successive fields are generated on the basis of the inputted interlaced video signal, and the progressive signal is generated on the basis of the generated plurality of interlaced video signals. The interlaced pixels between lines are generated by the interpolation processing using the progressive signal generated, and the interpolation signal including the pixels in the progressive signal and the interpolated pixels is outputted. The motion amount in the vertical direction of the picture is calculated on the basis of the outputted interpolation signal.

Therefore, more precise motion detection can be performed, thereby making it possible to generate a progressive video signal having a high resolution whose picture quality is hardly degraded. As a result, accurate motion detection can be performed. Even when a picture having a large luminance difference in the vertical direction slowly moves, therefore, accurate motion judgment is made, thereby making it possible to convert the interlaced video signal into a progressive video signal which is stable and has a high resolution.

BEST MODE FOR CARRYING OUT THE INVENTION

Description is now made of a picture conversion apparatus according to the present invention. Although in the following description, a video signal corresponds to a luminance signal, a chrominance signal can be also subjected to the same processing. The present invention is not limited to this example. Even when color display is performed, the same effect can be obtained with respect to an RGB (red, green, blue) signal by performing processing for each color in the following manner.

First Embodiment

Figure 1:
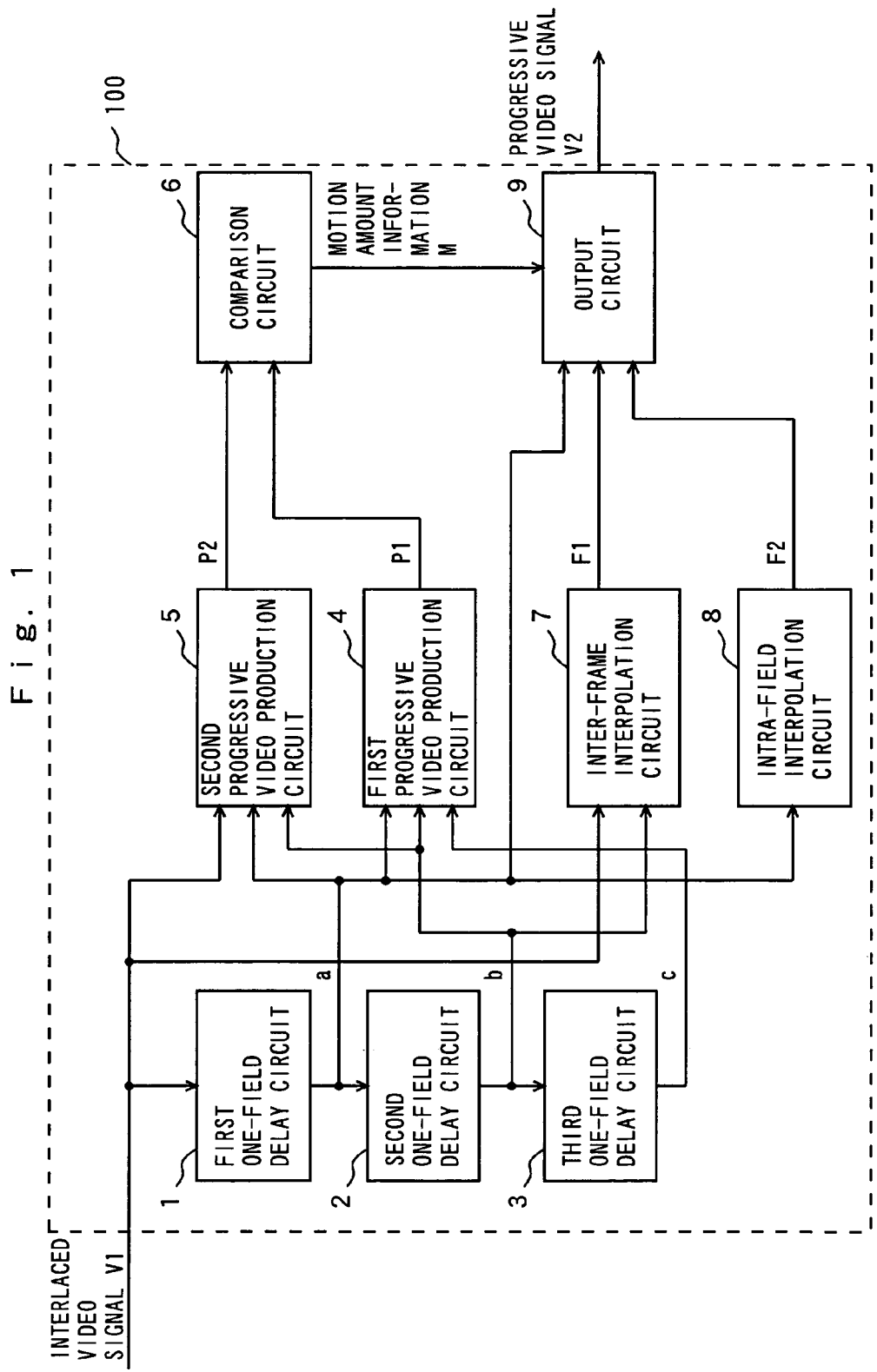
FIG. 1 is a block diagram showing a picture conversion apparatus according to a first embodiment of the present invention.

FIG. 1 is a block diagram showing a picture conversion apparatus 100 according to a first embodiment of the present invention. The picture conversion apparatus 100 shown in FIG. 1 comprises a first one-field delay circuit 1, a second one-field delay circuit 2, a third one-field delay circuit 3, a first progressive video generation circuit 4, a second progressive video generation circuit 5, a comparison circuit 6, an inter-frame interpolation circuit 7, an intra-field interpolation circuit 8, and an output circuit 9. Further, the picture conversion apparatus 100 comprises a timing generation circuit (not shown) for generating a timing signal required for each block upon receipt of a signal which is synchronized with an interlaced video signal V1 and a signal corresponding thereto.

The operations of the picture conversion apparatus 100 will be described below. First, the interlaced video signal V1 is successively delayed by the first one-field delay circuit 1, the second one-field delay circuit 2, and the third one-field delay circuit 3 which are continuously connected. Consequently, an interlaced video signal a delayed by one field, an interlaced video signal b delayed by two fields, and an interlaced video signal c delayed by three fields are respectively generated. Consequently, the four interlaced video signals successively delayed field by field are generated.

Each of the four interlaced video signals is composed of a first odd field signal, a first even field signal, a second odd field signal, and a second even field signal, or is composed of a first even field signal, a first odd field signal, a second even field signal, and a second odd field signal. Two fields composing the interlaced video signal constitute all scanning lines on a screen. Therefore, one of the fields and the other field are respectively herein referred to as an odd field and an even field.

The interlaced video signals a, b, and c are fed to the first progressive video generation circuit 4. The first progressive video generation circuit 4 generates a progressive video field signal P1 from the signals, and feeds the generated first progressive video field signal P1 to the comparison circuit 6. Further, the interlaced video signals V1, a, and b are fed to the second progressive video generation circuit 5. The second progressive video generation circuit 5 generates a progressive video field signal P2 from the signals, and feeds the generated second progressive video field signal P2 to the comparison circuit 6.

The comparison circuit 6 compares the progressive video field signal P1 and the progressive video field signal P2 to operate motion amount information M, and feed the operated motion amount information M to the output circuit 9.

The interlaced video signal V1 and the interlaced video signal b are fed to the inter-frame interpolation circuit 7. The inter-frame interpolation circuit 7 generates an inter-frame interpolation signal F1 by fame interfield interpolation performed between a field and a field which is two fields preceding or succeeding the field on a time basis.

Furthermore, the interlaced video signal a is fed to the intra-field interpolation circuit 8. The intra-field interpolation circuit 8 generates an inter-frame interpolation signal F2 by intra-field interpolation from the interlaced video signal a, and outputs the generated signal to the output circuit 9.

The output circuit 9 outputs a progressive video signal V2 generated by changing for each pixel the ratio of the inter-frame interpolation signal F1 to the intra-field interpolation signal F2 depending on the motion amount information M. When the motion amount information M is small, the probability of a still picture is high. Accordingly, the output circuit 9 generates the progressive video signal V2 such that the ratio of the inter-frame interpolation signal F1 becomes higher.

The picture conversion apparatus 100 according to the present embodiment generates the progressive video field signal P2 from the first to third interlaced video signals out of the four interlaced video signals successively delayed field by field, and generates the progressive video field signal P1 from the second to fourth interlaced video signals.

The picture conversion apparatus 100 can then compare the progressive video field signal P1 and the progressive video field signal P2, and output the results of the comparison as motion amount information M. Consequently, the picture conversion apparatus 100 can make accurate motion judgment. Even in cases such as a case where a picture having a large luminance difference in the vertical direction slowly moves, therefore, the picture conversion apparatus 100 can make accurate motion judgment, thereby making it possible to provide a progressive video signal which is stable and has a high resolution.

Figure 16:
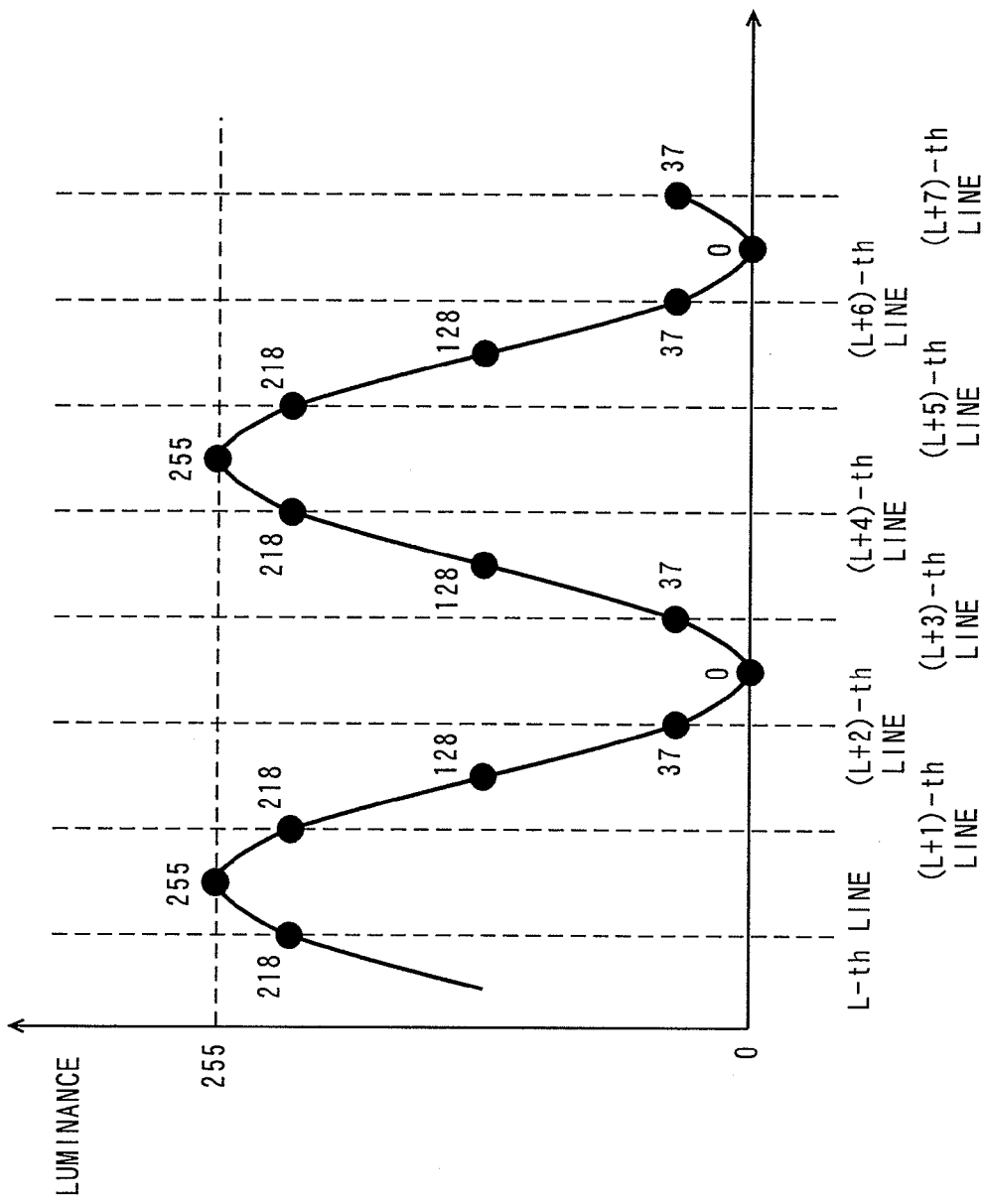
FIG. 16 is a diagram showing an example of a picture whose luminance changes in a sine wave manner in the vertical direction.
Figure 17:
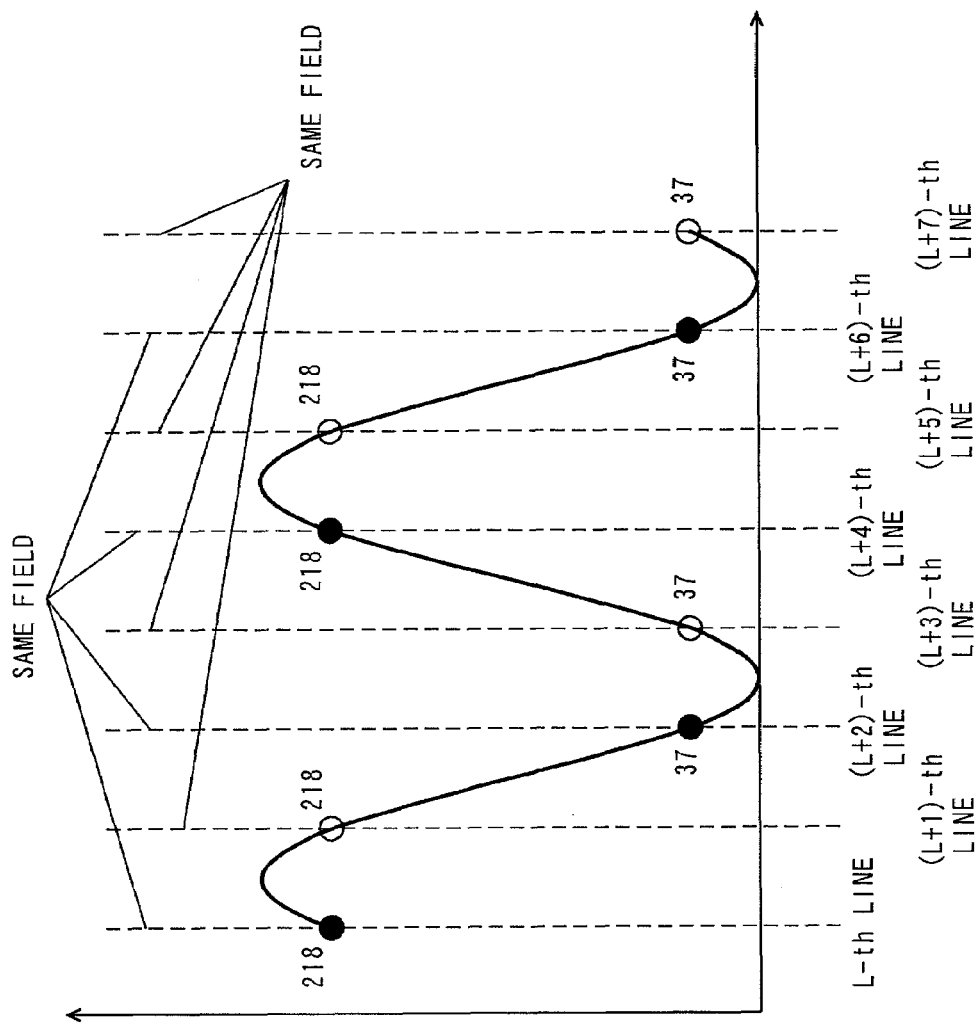
FIG. 17 is a diagram showing an original video signal which has not been converted yet into an interlaced video signal yet.
Figure 18:
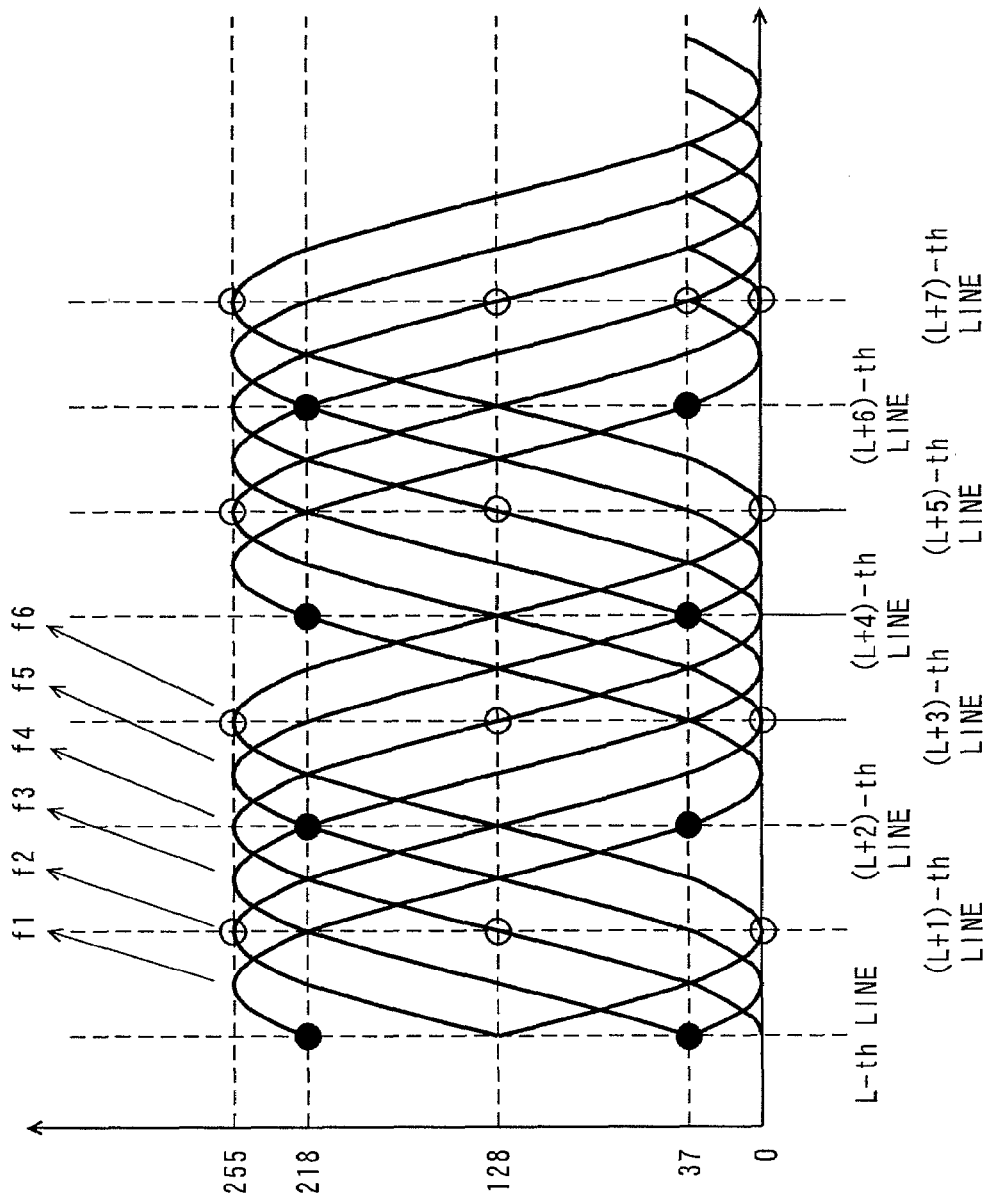
FIG. 18 is a diagram showing a superimposition of video signals obtained by shifting an interlaced video signal a half line at a time for each field.

The effect of the present invention will be described using an example of operations in a case where a picture, whose picture quality has been degraded in the prior art, changing in luminance in a sine wave manner in the vertical direction shown in FIG. 16 slowly moves in the vertical direction, as shown in FIG. 18.

The value of an original video signal and the value of a video signal which has already been sampled as an interlaced video signal are shown in Table 5(a) and Table 5(b), as in Table 1(a) and Table 1(b) in the prior art. Table 5(a) and Table 5(b) show nine fields from the f1-th field to the f9-th field.

TABLE 5

Relationship Between Line and Sampled Value in Each Field

| | f1 | f2 | f3 | f4 | f5 | f6 | f7 | f8 | f9 |
|---|---|---|---|---|---|---|---|---|---|
| (a) Value of Original Video Signal | | | | | | | | | |
| L | 218 | 128 | 37 | 0 | 37 | 128 | 218 | 255 | 218 |
| L + 1 | 218 | 255 | 218 | 128 | 37 | 0 | 37 | 128 | 218 |
| L + 2 | 37 | 128 | 218 | 255 | 218 | 128 | 37 | 0 | 37 |
| L + 3 | 37 | 0 | 37 | 128 | 218 | 255 | 218 | 128 | 37 |
| L + 4 | 218 | 128 | 37 | 0 | 37 | 128 | 218 | 255 | 218 |
| L + 5 | 218 | 255 | 218 | 128 | 37 | 0 | 37 | 128 | 218 |
| L + 6 | 37 | 128 | 218 | 255 | 218 | 128 | 37 | 0 | 37 |
| L + 7 | 37 | 0 | 37 | 128 | 218 | 255 | 218 | 128 | 37 |
| (b) Value of Sampled Video Signal | | | | | | | | | |
| L | 218 | — | 37 | — | 37 | — | 218 | — | 218 |
| L + 1 | — | 255 | — | 128 | — | 0 | — | 128 | — |
| L + 2 | 37 | — | 218 | — | 218 | — | 37 | — | 37 |
| L + 3 | — | 0 | — | 128 | — | 255 | — | 128 | — |
| L + 4 | 218 | — | 37 | — | 37 | — | 218 | — | 218 |
| L + 5 | — | 255 | — | 128 | — | 0 | — | 128 | — |
| L + 6 | 37 | — | 218 | — | 218 | — | 37 | — | 37 |
| L + 7 | — | 0 | — | 128 | — | 255 | — | 128 | — |

Table 5(a) shows a value on each line in each field in the original video signal, and Table 5(b) shows a value on each line in each field in the video signal which has already been sampled as the interlaced video signal. Generally, the interlaced video signal shown in Table 5(b) is successively transmitted for each field. Even in FIG. 1, the interlaced video signal shown in Table 5(b) is successively fed for each field as the interlaced video signal V1 to the picture conversion apparatus 100.

The interlaced video signal V1 is fed to the first one-field delay circuit 1, the second one-field delay circuit 2, and the third one-field delay circuit 3. The first progressive video generation circuit 4 and the second progressive video generation circuit 5 respectively generate the progressive video field signal P1 and the progressive video field signal P2 by interpolation processing. The operations will be described in detail below.

Figure 2:
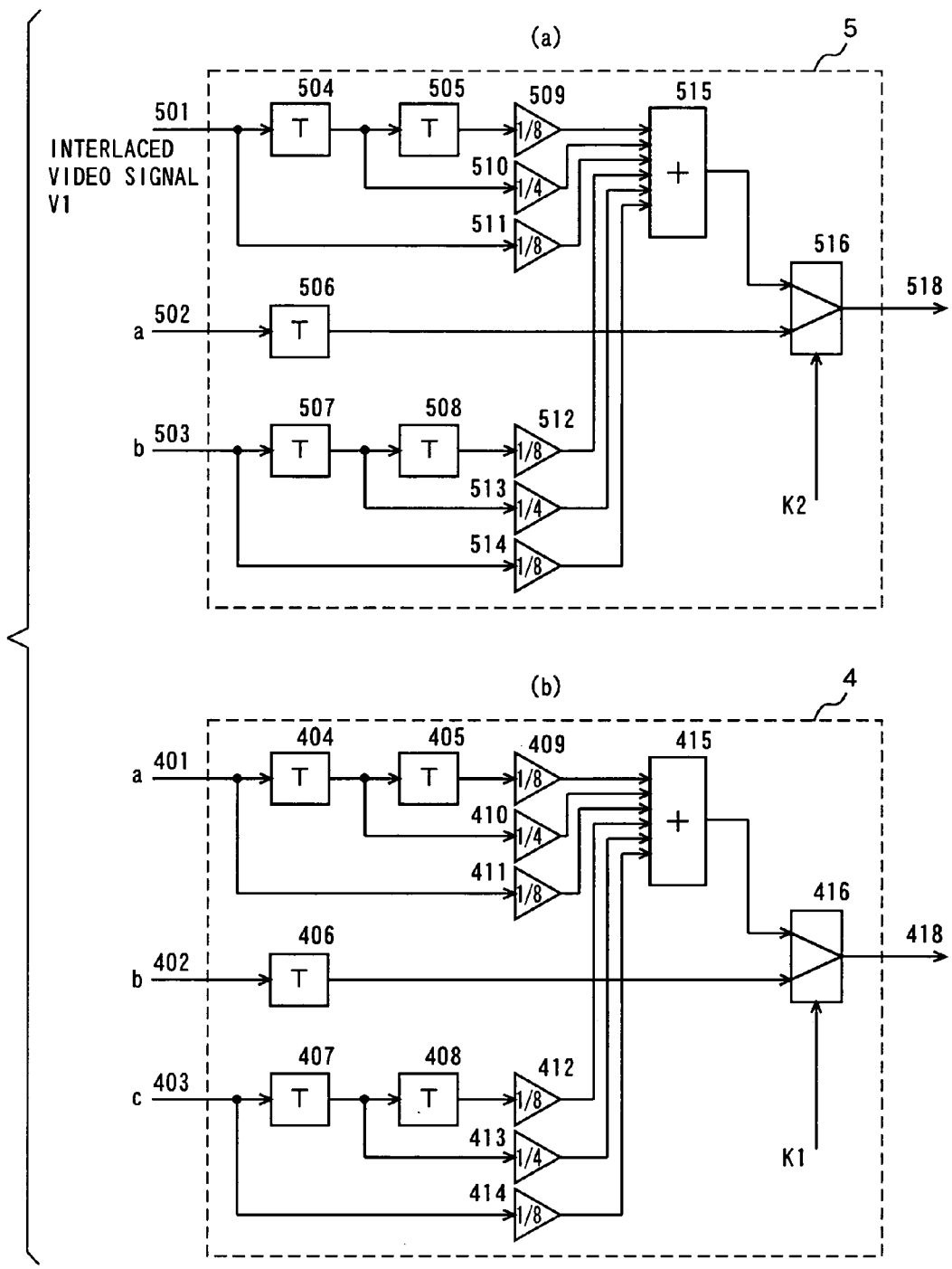
FIG. 2(a) is a diagram showing an example of the configuration of the inside of a first progressive video generation circuit.
FIG. 2(b) is a diagram showing an example of the configuration of the inside of a second progressive video generation circuit.

FIG. 2(*a*) illustrates an example of the configuration of the inside of the second progressive video generation circuit 4, and FIG. 2(*b*) illustrates an example of the configuration of the inside of the first progressive video generation circuit 5.

The interlaced video signal V1, the interlaced video signal a, and the interlaced video signal b shown in FIG. 1 are respectively fed to an input terminal 501, an input terminal 502, and an input terminal 503 shown in FIG. 2(*a*).

The interlaced video signal a, the interlaced video signal b, and the interlaced video signal c shown in FIG. 1 are respectively fed to an input terminal 401, an input terminal 402, and an input terminal 403 shown in FIG. 2(*b*).

The second progressive video generation circuit 5 shown in FIG. 2(*a*) comprises one-clock delay circuits 504 to 508, multiplication circuits 509 to 514, an addition circuit 515, and a switching circuit 516.

The first progressive video generation circuit 4 shown in FIG. 2(*b*) comprises one-clock delay circuits 404 to 408, multiplication circuits 409 to 414, an addition circuit 415, and a switching circuit 416.

The multiplication circuits 409, 411, 412, 414, 509, 511, 512, and 514 respectively perform ⅛ multiplication, and the multiplication circuits 410, 413, 510, and 513 respectively perform ¼ multiplication.

The addition circuit 415 adds signals outputted from the multiplication circuits 409 to 414. Similarly, the addition circuit 515 adds signals outputted from the multiplication circuits 509 to 514.

By such a configuration, in the first progressive video generation circuit 4, the interlaced video signals a and c are averaged after being respectively filtered in the horizontal direction, and are fed to the addition circuit 415.

The switching circuit 416 outputs the interlaced video signal b which is delayed by one field in the one-clock delay circuit 406 if the interlaced video signal b is a signal on a current line, while outputting a signal generated by the addition circuit 415 if the interlaced video signal b is a signal on an interpolation line on the basis of a signal K1 fed from a timing generation circuit (not shown).

Similarly, in the second progressive video generation circuit 5, the interlaced video signals V1 and b are averaged after being respectively filtered in the horizontal direction, and are fed to the addition circuit 515.

The switching circuit 516 outputs a signal obtained by delaying the interlaced video signal a by one field in the one-clock delay circuit 506 if the interlaced video signal a is a signal on a current line, while outputting a signal generated by the addition circuit 515 if the interlaced video signal a is a signal on an interpolation line on the basis of a signal K2 fed from a timing generation circuit (not shown).

Furthermore, filtering processing and addition processing performed inside the first progressive video generation circuit 4 and the second progressive video generation circuit 5 correspond to an operation of corresponding pixels and pixels peripheral thereto in the first field and the third field on the interpolation line or an operation of corresponding pixels and pixels peripheral thereto in the second field and the fourth field on the interpolation line. Particularly in this case, an average value is calculated.

If the average value is used, a complicated operation can be simplified, so that the circuit scale can be reduced. However, the present invention is not limited to the same. For example, interpolation processing can be also performed by changing a size contribution by each of the fields in consideration of respective weights in the fields.

Table 6(a) and Table 6(b) respectively show the signals outputted from the first progressive video generation circuit 4 and the second progressive video generation circuit 5 by such operations.

TABLE 6

Output of Progressive Video Production Circuit (a) Example of Output of First Progressive Video Production Circuit 4

|     | f3  | f4  | f5  | f6  | f7  | f8  | f9  |
|-----|-----|-----|-----|-----|-----|-----|-----|
| L   | 218 | 128 | 37  | 37  | 37  | 128 | 218 |
| L+1 |     | 255 | 191 | 128 | 64  | 0   | 64  |
| L+2 | 37  | 128 | 218 | 218 | 218 | 128 | 37  |
| L+3 |     | 0   | 64  | 128 | 191 | 255 | 191 |
| L+4 | 218 | 128 | 37  | 37  | 37  | 128 | 218 |
| L+5 |     | 255 | 191 | 128 | 64  | 0   | 64  |
| L+6 | 37  | 128 | 218 | 218 | 218 | 128 | 37  |
| L+7 |     | 0   | 64  | 128 | 191 | 255 | 191 |

TABLE 6-continued

Output of Progressive Video Production Circuit (b) Example of Output of Second Progressive Video Production Circuit 5

|     | f3  | f4  | f5  | f6  | f7  | f8  | f9  |
|-----|-----|-----|-----|-----|-----|-----|-----|
| L   | 128 | 37  | 37  | 37  | 128 | 218 | 218 |
| L+1 | 255 | 191 | 128 | 64  | 0   | 64  | 128 |
| L+2 | 128 | 218 | 218 | 218 | 128 | 37  | 37  |
| L+3 | 0   | 64  | 128 | 191 | 255 | 191 | 128 |
| L+4 | 128 | 37  | 37  | 37  | 128 | 218 | 218 |
| L+5 | 255 | 191 | 128 | 64  | 0   | 64  | 128 |
| L+6 | 128 | 218 | 218 | 218 | 128 | 37  | 37  |
| L+7 | 0   | 64  | 128 | 191 | 255 | 191 | 191 |

In Table 6(a) and Table 6(b), a hatched column is a portion found as an interpolation line by an operation. Further, it is assumed that there is no effect in the horizontal direction because signals having the same value are continued in the horizontal direction as to an example of the operation.

Of course, the actual picture conversion apparatus 100 performs a filtering operation in the horizontal direction, thereby making it possible to reduce the effect of noise or the like.

A value on the L-th line in the f4-th field shown in Table 6(a) is calculated in the following manner. For example, description is made of a case where a signal in the f4-th field is fed as the interlaced video signal V1 to the picture conversion apparatus 100. Since no signal is transmitted on the L-th line in the f4-th field, as shown in FIG. 5(b), interpolation processing must be performed. When the signal in the f4-th field is inputted as the interlaced video signal V1, a signal in the f1-th field is outputted from the third one-field delay circuit 3, a signal in the f2-th field is outputted from the second one-field delay circuit 2, and a signal in the f3-th field is outputted from the first one-field delay circuit 1.

At this time, an interpolation line in the progressive video field signal P1 is operated from the respective values on a current line of the signal in the f1-th field outputted from the third one-field delay circuit 3 and the signal in the f3-th field outputted from the first one-field delay circuit 1. In this case, an average value (or a value close to the average value) is operated.

Consequently, the value on the L-th line in the f4-th field is a value "128" found by rounding an average "(218+37)/2=127.5" of a value "218" on the L-th line in the f1-th field and a value "37" on the L-th line in the f3-th field in Table 5(a) to the nearest whole number. Similarly, signals on respective interpolation lines are found. A column shown with "minus mark" in Table 6(a) is not given a value because the value is not found by only Table 5(b).

A value on the L-th line in the f3-th field shown in Table 6(b) is calculated in the following manner. When a signal in the f3-th field is fed as the interlaced video signal V1 to the picture conversion apparatus 100, a signal in the f1-th field is outputted from the second one-field delay circuit 2, and a signal in the f2-th field is outputted from the first one-field delay circuit 1.

At this time, an interpolation line in the progressive video field signal P2 is operated from the respective values on a current line of the signal in the f1-th field outputted from the second one-field delay circuit 2 and the signal in the f3-th field which is the interlaced video signal V1. In this case, an average value (or a value close to the average value) is operated.

Consequently, the value on the L-th line in the f4-th field is a value "128" found by rounding an average "(218+37)/2=127.5" of a value "218" on the L-th line in the f1-th field and a value "37" on the L-th line in the f3-th field shown in Table 5(a) to the nearest whole number. Similarly, signals on respective interpolation lines are found.

Figure 3:
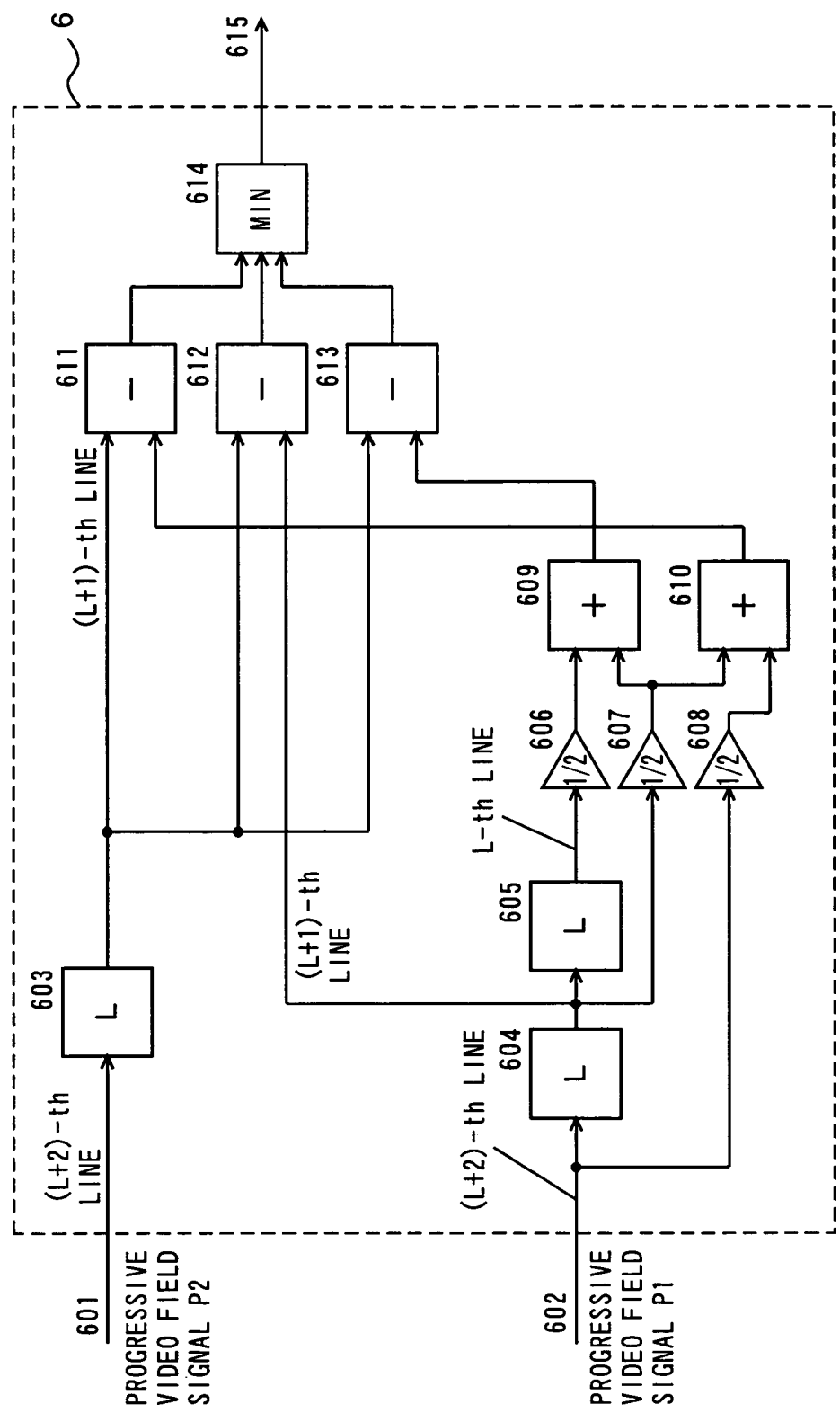
FIG. 3 is a diagram showing an example of the configuration of the inside of a comparison circuit.

The operations of the comparison circuit 6 will be then described in detail. FIG. 3 illustrates an example of the configuration of the inside of the comparison circuit 6.

As shown in FIG. 3, the progressive video field signal P2 is fed to an input terminal 601, and a progressive video field signal P1 is fed to an input terminal 602.

The comparison circuit 6 comprises one-line delay circuits 603 to 605, multiplication circuits 606 to 608, addition circuits 609 and 610, subtraction circuits 611 to 613, and a minimum value selection circuit 614.

The second progressive video field signal P2 fed to the input terminal 601 is fed to the one-line delay circuit 603. The first progressive video field signal P1 fed to the input terminal 602 is fed to the one-line delay circuit 604. A signal outputted from the one-line delay circuit 604 is fed to the one-line delay circuit 605.

The multiplication circuit 606 multiplies a signal outputted from the one-line delay circuit 605 by one-half, the multiplication circuit 607 multiplies a signal outputted from the one-line delay circuit 604 by one-half, and the multiplication circuit 608 multiplies the progressive video field signal P1 by one-half.

The addition circuit 609 adds signals outputted from the multiplication circuits 606 and 607 together, and the addition circuit 610 adds the signals outputted from the multiplication circuits 607 and 608 together.

The subtraction circuit 611 finds a value obtained by subtracting the signal outputted from the one-line delay circuit 603 and the signal outputted from the addition circuit 609, and outputs the absolute value of the value. The subtraction circuit 612 finds a value obtained by subtracting the signal outputted from the one-line delay circuit 603 and the signal outputted from the one-line delay circuit 604, and outputs the absolute value of the value. The subtraction circuit 613 finds a value obtained by subtracting the signal outputted from the one-line delay circuit 603 and the signal outputted from the addition circuit 610, and outputs the absolute value of the value.

The minimum value selection circuit 614 selects the minimum of the values of the signals outputted from the subtraction circuits 611 to 613. The signal outputted from the minimum value selection circuit 614 is outputted from an output terminal 615 as an output signal from the comparison circuit 6.

This operation is performed, when an interpolation line generated by the second progressive video generation circuit 5 is fed to the input terminal 601, between a pixel on the interpolation line and a corresponding pixel in the progressive video field signal P1 fed to the input terminal 602. That is, the operation corresponds to an operation for comparing the values of corresponding pixels in the progressive video field signal P1 and the progressive video field signal P2 and comparing for each pixel the values of the corresponding pixels and pixels peripheral thereto, to output the respective results of the comparison as the motion amount information M.

The results of the comparison operation are shown in Table 7(a). In Table 7, a vertical column of lines and a horizontal column of fields show the timing of the interlaced video signal a outputted from the first one-field delay circuit 1.

TABLE 7

Results of Comparison Operation (a) Example of Output of Operation Circuits 611, 612, 613

|     | f3 | f4 | f5 | f6 | f7 | f8 | f9 |
|-----|----|----|----|----|----|----|----|
| L   |    | —  |    | —  |    | —  |    |
| L+1 |    |    | 0  |    | 19 |    | 0  |
|     |    |    | 64 |    | 64 |    | 64 |
|     |    |    | 0  |    | 109|    | 0  |
| L+2 |    | —  |    | 13 |    | 13 |    | 19 |
|     |    |    |    | 0  |    | 0  |    | 64 |
|     |    |    |    | 77 |    | 77 |    | 109|
| L+3 |    |    | 0  |    | 19 |    | 0  |
|     |    |    | 64 |    | 64 |    | 64 |
|     |    |    | 0  |    | 109|    | 0  |
| L+4 |    | —  |    | 13 |    | 13 |    | 19 |
|     |    |    |    | 0  |    | 0  |    | 64 |
|     |    |    |    | 77 |    | 77 |    | 109|
| L+5 |    |    | 0  |    | 19 |    | 0  |
|     |    |    | 64 |    | 64 |    | 64 |
|     |    |    | 0  |    | 109|    | 0  |
| L+6 |    | —  |    | 13 |    | 13 |    | 19 |
|     |    |    |    | 0  |    | 0  |    | 64 |
|     |    |    |    | 77 |    | 77 |    | 109|
| L+7 |    | —  |    | —  |    | —  |    |

(b) Example of Output of Second Progressive Video Production Circuit 5

|     | f3 | f4 | f5 | f6 | f7 | f8 | f9 |
|-----|----|----|----|----|----|----|----|
| L   |    | —  |    | —  |    | —  |    |
| L+1 |    | 0 (0,0) |   | 19 (0,2) |   | 0 (0,0) |   |
| L+2 |    |    | 0 (0,0) |   | 13 (0,2) |   | 19 (0,2) |
| L+3 |    | 0 (0,0) |   | 19 (0,2) |   | 0 (0,0) |   |
| L+4 |    | —  |    | 0 (0,0) |   | 13 (0,2) |   | 19 (0,2) |
| L+5 |    | 0 (0,0) |   | 19 (0,2) |   | 0 (0,0) |   |
| L+6 |    |    | 0 (0,0) |   | 13 (0,2) |   | 19 (0,2) |
| L+7 |    | —  |    | —  |    | —  |    |

For example, an operation in a case where a value on the (L+2)-th line in the f4-th field is fed to the comparison circuit 6 is as follows. A value "191" which is a value on the (L+1)-th line in the f4-th field in the progressive video field signal P2 is inputted to the subtraction circuit 611 in this case.

An average "191.5" of a value "128" on the L-th line and a value "255" on the (L+1)-th line in the f4-th field in the progressive video field signal P1 is found from the multiplication circuits 607 and 608 and the addition circuit 610, and the nearest whole number "191" is fed to the subtraction circuit 611. Consequently, the subtraction circuit 611 outputs the absolute value "0" of a value obtained by the subtraction of the values fed thereto.

Furthermore, the value "191" on the (L+1)-th line in the f4-th field in the progressive video field signal P2 and the value "255" on the (L+1)-th line in the f4-th field in the progressive video field signal P1 are fed to the subtraction circuit 612. Consequently, the subtraction circuit 612 outputs an absolute value "64" of a value obtained by the subtraction of the values fed thereto.

Furthermore, the value "191" on the (L+1)-th line in the f4-th field in the progressive video field signal P2 is fed to the subtraction circuit 613. Further, an average "191" of the value "255" on the (L+1)-th line and the value "128" on the (L+2)-th line in the f4-th field in the progressive video field signal P1 is fed to the subtraction circuit 613. Consequently, the subtraction circuit 613 outputs the absolute value "0" of a value obtained by the subtraction of the values fed thereto.

The results of the three operations are given as the values "0", "64", and "0" in a column of the (L+1)-th line in the f4-th field shown in Table 7(a). Similarly, the results of the operations from the subtraction circuits 611 to 613 are given in each of hatched columns of interpolation lines shown in Table 7(a).

Table 7(b) shows the minimum of the values fed from the subtraction circuits 611 to 613. In a column of the (L+1)-th line in the f4-th field, for example, the minimum "0" of the values "0", "64", and "0" which are the output signals from the subtraction circuits 611 to 613 is selected and is given.

Although an example of the above-mentioned operation as the operations of the comparison circuit 6 is thus illustrated, the operation of the comparison circuit 6 is not limited to the foregoing. For example, the operation may be further performed in consideration of values on peripheral lines. In the case, an operation of pixels and pixels peripheral thereto can be performed. Accordingly, the comparison circuit 6 can perform higher-precision comparison, and can be so configured as to have tolerance for noise or the like.

The picture conversion apparatus 100 according to the present embodiment operates, with respect to a pixel on an interpolation line in the progressive video field signal P2, the differences between the value of a corresponding pixel on the current line in the progressive video field signal P1 and the values of pixels on the interpolation lines above and below the current line, to find the motion amount information M. Contrary to this, however, the picture conversion apparatus 100 may find, with respect to a pixel on the interpolation line in the progressive video field signal P1, the differences between the value of a corresponding pixel on the current line in the progressive video field signal P2 and the values of pixels on the interpolation lines above and below the current line, to find the motion amount information M. Both configurations may be combined with each other.

The operations of the inter-frame interpolation circuit 7 and the intra-field interpolation circuit 8 will be then described in detail.

Figure 4:
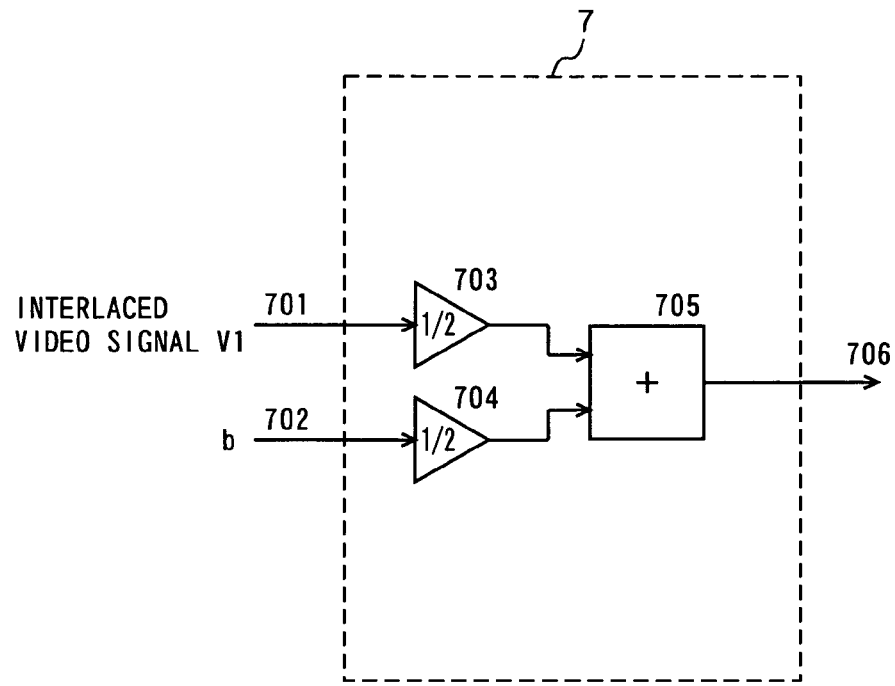
FIG. 4 is a diagram showing an example of the configuration of an inter-frame interpolation circuit.
Figure 5:
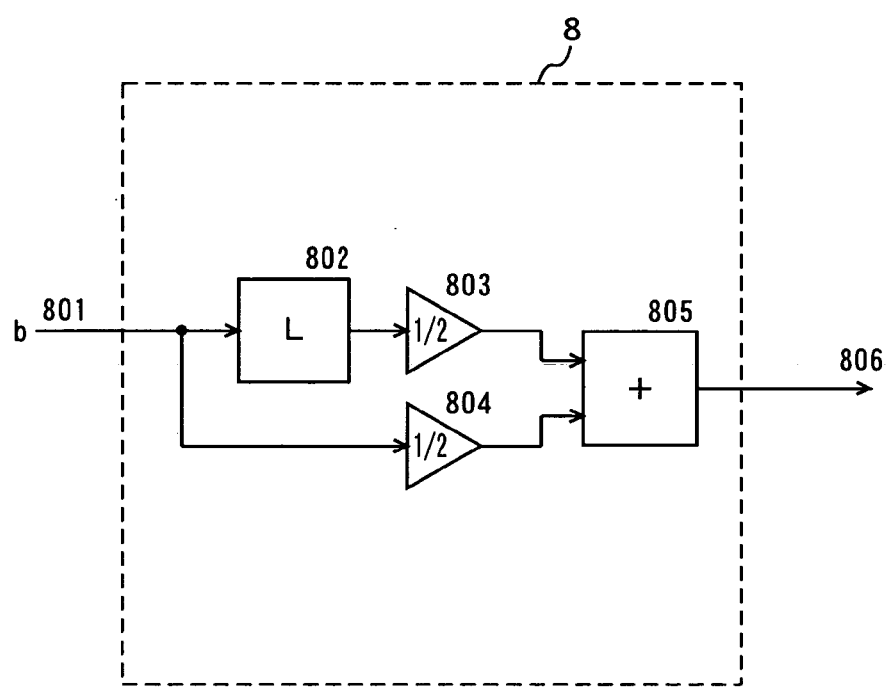
FIG. 5 is a diagram showing an example of the configuration of the inside of an intra-field interpolation circuit.

FIG. 4 illustrates an example of the configuration of the inside of the inter-frame interpolation circuit 7, and FIG. 5 illustrates an example of the configuration of the intra-field interpolation circuit 8.

As shown in FIG. 4, the inter-frame interpolation circuit 7 comprises ½ multiplication circuits 703 and 704 and an addition circuit 705.

The interlaced video signal V1 shown in FIG. 1 is fed to an input terminal 701 of the inter-frame interpolation circuit 7. The interlaced video signal b is fed to an input terminal 702 of the inter-frame interpolation circuit 702.

The interlaced video signals V1 and b fed to the inter-frame interpolation circuit 7 are respectively multiplied by one-half in the multiplication circuits 703 and 704, and are then added together in the addition circuit 705, and the result of the addition is outputted as the inter-frame interpolation signal F1 from an output terminal 706.

Furthermore, the inter-frame interpolation circuit 7 is subjected to timing control by a signal from a timing generation circuit (not shown) and is operated to operate an interpolation line in a field to be paid attention to (hereinafter referred to as an object field).

As shown in FIG. 5, the intra-field interpolation circuit 8 comprises a one-line delay circuit 802, ½ multiplication circuits 803 and 804, and an addition circuit 805.

The interlaced video signal a shown in FIG. 1 is fed to an input terminal 801 of the intra-field interpolation circuit 8. The interlaced video signal a is fed to the one-line delay circuit 802 and the multiplication circuit 804. The multiplication circuit 803 multiplies the fed signal by one-half, and then feeds the result of the multiplication to the addition circuit 805. The multiplication circuit 804 multiplies the fed signal by one-half, and then feeds the result of the multiplication to the addition circuit 805:

The addition circuit 805 adds the fed signals, and outputs the result of the addition as an inter-frame interpolation signal F2 from an output terminal 806.

Similarly to the inter-frame interpolation circuit 7, the intra-field interpolation circuit 8 is subjected to timing control by a signal from a timing generation circuit (not shown) and is operated to operate an interpolation line in an object field.

Examples of output signals of the inter-frame interpolation circuit 7 and the intra-field interpolation circuit 8 are respectively shown in the following.

TABLE 8

Example of Output of Interpolation Circuit (a) Example of Output of Inter-frame Interpolation Circuit 7

|     | f3  | f4  | f5  | f6  | f7  | f8  | f9  |
|-----|-----|-----|-----|-----|-----|-----|-----|
| L   | 128 |     | 37  |     | 128 |     | 218 |
| L+1 |     | 191 |     | 64  |     | 64  |     |
| L+2 | 128 |     | 218 |     | 128 |     | 37  |
| L+3 |     | 64  |     | 191 |     | 191 |     |
| L+4 | 128 |     | 37  |     | 128 |     | 218 |
| L+5 |     | 191 |     | 64  |     | 64  |     |
| L+6 | 128 |     | 218 |     | 128 |     | 37  |
| L+7 |     | 64  |     | 191 |     | 191 |     |

(b) Example of Output of Field Intra-field Interpolation Circuit 8

|     | f3  | f4  | f5  | f6  | f7  | f8  | f9  |
|-----|-----|-----|-----|-----|-----|-----|-----|
| L   |     |     |     |     |     |     |     |
| L+1 |     | 128 |     | 128 |     | 128 |     |
| L+2 | 128 |     | 128 |     | 128 |     | 128 |
| L+3 |     | 128 |     | 128 |     | 128 |     |
| L+4 | 128 |     | 128 |     | 128 |     | 128 |
| L+5 |     | 128 |     | 128 |     | 128 |     |
| L+6 | 128 |     | 128 |     | 128 |     | 128 |
| L+7 |     |     |     |     |     |     |     |

Table 8(a) shows the signal outputted from the inter-frame interpolation circuit 7, and Table 8(b) shows the signal outputted from the intra-field interpolation circuit 8. In Table 8, values in hatched columns are the values of signals on an interpolation line in an object field, and the values are operated. Table 8 shows values obtained by interpolation processing at the timing of the interlaced video signal a.

For example, a value in a column of the L-th line in the f3-th field in Table 8 (a) is as follows. That is, a value in a case where the interlaced video signal a is on the L-th line in the f3-th field is found as follows.

In this case, a value "37" on the L-th line in the f3-th field in the interlaced video signal V1 (see Table 5(b)) is fed to the input terminal 701 of the inter-frame interpolation circuit 7. Further, a value "218" on the L-th line in the f1-th field of the interlaced video signal b is fed to the input terminal 702 of the inter-frame interpolation circuit 7. The inter-frame interpolation circuit 7 multiplies the fed values by one-half, respectively, in the multiplication circuits 703 and 704, and adds the respective values obtained by the multiplication in the addition circuit 705, to find the whole number "128" nearest to a value "127.5" obtained by the addition. In the same way, respective values in the other hatched columns are operated.

An example of the intra-field interpolation signal F2 outputted from the intra-field interpolation circuit 8 is then shown in Table 8(b). Table 8(b) shows values obtained by interpolation processing at the timing of the interlaced video signal a. A value obtained by subjecting the interlaced video signal a to interpolation processing on the (L+1)-th line in the f3-th field will be described as an example.

When a signal on the (L+1)-th line in the f3-th field is the interlaced video signal a, a value "0" on the (L+3)-th line in the f2-th field which is an output from the first one-field delay circuit 1 is inputted to the intra-field interpolation circuit 8. At this time, a value on a line which is one or more lines preceding a current line, that is, a value "255" on the (L+1)-th line in the f2-th field is outputted from the one-line delay circuit 802, and is multiplied by one-half in the multiplication circuit 803. Further, a value "0" on the (L+3)-th line in the f2-th field is multiplied by one-half in the multiplication circuit 804, and the result of the multiplication is outputted.

The intra-field interpolation circuit 8 adds the signals fed from the multiplication circuits 803 and 804 in the addition circuit 805, to find "128" which is the whole number nearest to a value "127.5" obtained by the addition as a value obtained by intra-field interpolation. Similarly, respective values in the other hatched columns are operated.

Figure 6:
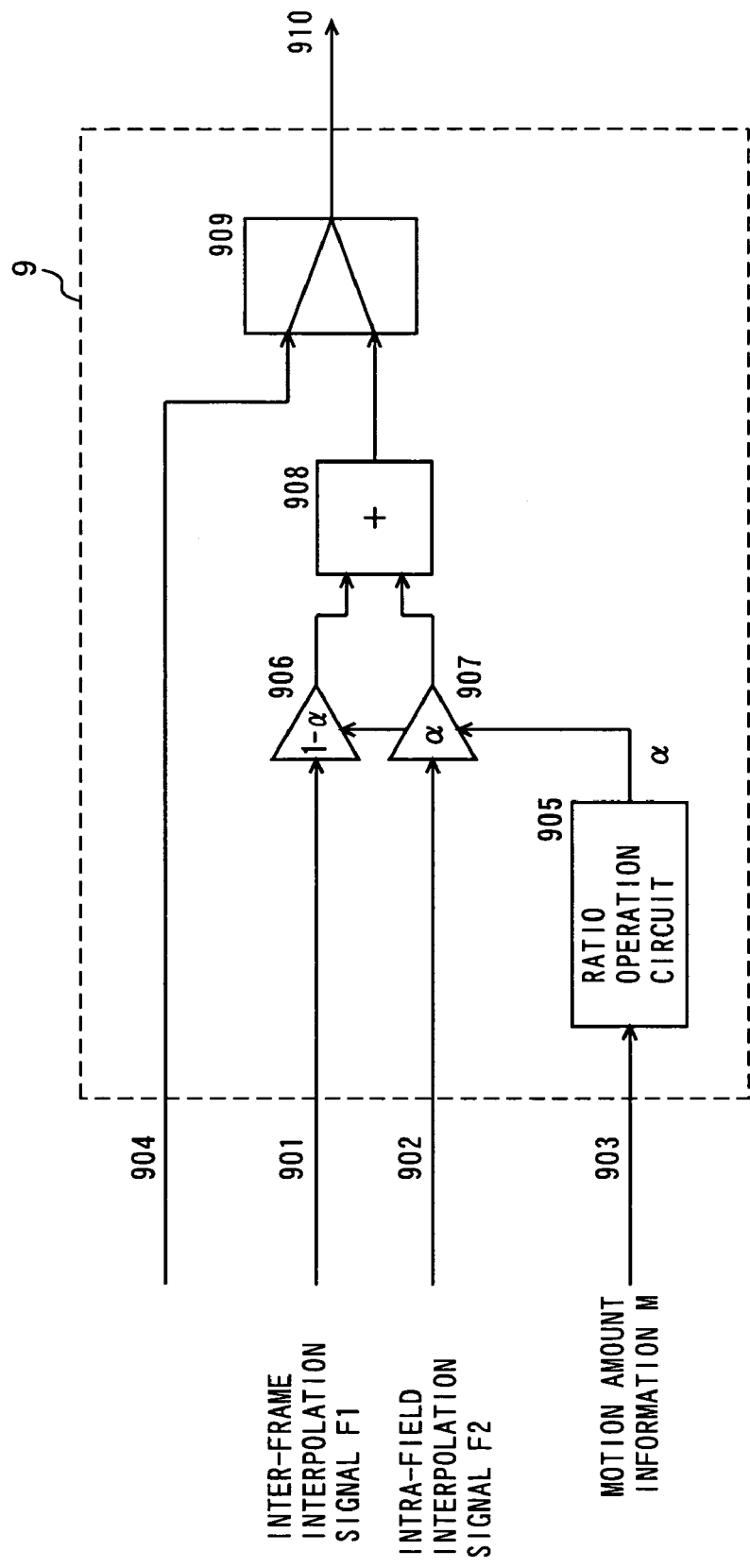
FIG. 6 is a diagram showing an example of the configuration of the inside of an output circuit.

The operations of the output circuit 9 will be then described in detail. FIG. 6 illustrates an example of the configuration of the inside of the output circuit 9.

As shown in FIG. 6, the output circuit 9 comprises a ratio operation circuit 905, multiplication circuits 906 and 907, an addition circuit 908, and a switching circuit 909. Here, α indicates a ratio value operated by the ratio operation circuit 905, which is a numerical value of not less than zero nor more than one. The multiplication circuit 907 is a α-times multiplication circuit, and the multiplication circuit 906 is a (1−α)-times multiplication circuit.

The inter-frame interpolation signal F1 is fed to an input terminal 901, and the intra-field interpolation signal F2 is fed to an input terminal 902. Further, the interlaced video signal a is fed to an input terminal 904, and a value corresponding to the motion amount information M is fed to an input terminal 903.

The ratio operation circuit 905 is a ratio operation circuit for operating the ratio of a still picture and a moving picture which are outputted from the output circuit 9 depending on the motion amount information M fed from the input terminal 903.

The ratio operation circuit 905 specifies the ratio value α which is a factor for determining the ratio of the inter-frame interpolation signal F1 to the intra-field interpolation signal F2 depending on the motion amount information M fed from the input terminal 903. For example, the ratio value α is determined as "α=0" when the motion amount information M outputted from the comparison circuit 6 satisfies 0≦M<10, "α=0.2" when it satisfies 10≦M<20, "α=0.5" when it satisfies 20≦M<30, and "α=1" when it satisfies 30≦M. The output circuit 9 thus carries out control such that the smaller the motion amount information M is, the lower the ratio value α becomes.

The multiplication circuits 906 and 907 respectively multiply the signals, which are respectively inputted from the input terminals 901 and 902, outputted from the inter-frame interpolation circuit 7 and the intra-field interpolation amount 8, and the addition circuit 908 adds the respective results of the multiplication.

Consequently, control can be carried out such that the smaller the motion amount information M is, the higher the ratio of the output of the inter-frame interpolation circuit 7 becomes.

The switching circuit 909 switches the interlaced video signal a fed to the input terminal 904 and a signal fed from the addition circuit 908. The switching circuit 909 can perform switching so as to output the interlaced video signal a if a signal in an object field is a signal on a current line, while outputting the signal outputted from the addition circuit 908 if it is a signal on an interpolation line.

The motion amount information M shown in Table 7(b) is inputted to the input terminal 903 of the switching circuit 9. Since the motion amount information M in the f4-th field, the f5-th field, and the f8-th field are respectively "0", for example, the ratio value α outputted from the ratio operation circuit 905 is operated as "0".

Since the motion amount information M in the f6-th field, the f7-th field, and the f9-th field are "19" or "13", the ratio value α outputted from the ratio operation circuit 905 is operated as "0.2". The ratio value α is shown in parentheses in Table 7(b).

Results obtained by the output circuit 9 performing an operation depending on whether the ratio value α is large or small are shown in Table 9.

TABLE 9

Value of Output Circuit 9 and Difference between Output Value of Output Circuit 9 and Value of Original Video Signal (a) Output of Output Circuit 9

|  | f3 | f4 | f5 | f6 | f7 | f8 | f9 |
|---|---|---|---|---|---|---|---|
| L |  | 37 |  | 37 |  | 218 |  |
| L + 1 | 255 | 191 | 128 | 77 | 0 | 64 | 128 |
| L + 2 | 128 | 218 | 218 | 218 | 128 | 37 | 37 |
| L + 3 | 0 | 64 | 128 | 179 | 255 | 191 | 128 |
| L + 4 | 128 | 37 | 37 | 37 | 128 | 218 | 218 |
| L + 5 | 255 | 191 | 128 | 77 | 0 | 64 | 128 |
| L + 6 | 128 | 218 | 218 | 218 | 128 | 37 | 37 |
| L + 7 | 0 |  | 128 |  | 255 |  | 191 |

(b) Difference between Output Value of Output Circuit 9 and Value of Original Video Signal

|  | f3 | f4 | f5 | f6 | f7 | f8 | f9 |
|---|---|---|---|---|---|---|---|
| L |  |  |  |  |  |  |  |
| L + 1 |  | 26 |  | 39 |  | 26 |  |
| L + 2 | 0 |  | 37 |  | 0 |  | 37 |
| L + 3 |  | 26 |  | 39 |  | 26 |  |
| L + 4 | 0 |  | 37 |  | 0 |  | 37 |
| L + 5 |  | 26 |  | 39 |  | 26 |  |
| L + 6 | 0 |  | 37 |  | 0 |  | 37 |
| L + 7 |  |  |  |  |  |  |  |

In Table 9(a), on the (L+1)-th line in the f4-th field, for example, the ratio value α found from the motion amount information M is a value "0" (see Table 7(b)), so that the output value of the inter-frame interpolation circuit 7 is a value "191" (see Table 8(a)). Further, on the (L+1)-th line in the f6-th field, for example, the ratio value α found from the motion amount information M is a value "0.2" (see Table 7(b)), so that the output value of the inter-frame interpolation circuit 7 is the whole number "77" nearest to a value "76.8" which is the sum of a value "51.2" obtained by multiplying "64" (see Table 8(a)) by "0.8" (=1-0.2) and a value "25.6" obtained by multiplying a value "128" (see Table 8(b)) which is the output value of the intra-field interpolation circuit 8 by a value "0.2".

The value on the interpolation line which is hatched and the value on the current line which is not hatched are thus operated, as shown in Table 9(a).

Table 9(b) shows the absolute value of the difference between the value outputted from the output circuit 9 shown in Table 9(a) and an original video signal. In Table 9(b), the difference is calculated in the following manner in consideration of a time difference of one field which is a delay in the picture conversion apparatus 100.

Although a value "218" on the (L+3)-th line in the f5-th field in the original video signal is a value on a line which is not transmitted in the interlaced video signal, a value "179" is outputted as a value on the (L+3)-th line in the f6-th field from the output circuit 9. A value "39" is calculated as the absolute value of the difference between the value "218" on the (L+3)-th line in the f5-th field and the outputted value "179" on the (L+3)-th line in the f6-th field. In such a way, the difference between the value of the original video signal on an interpolation line and the value outputted from the output circuit 9 is calculated, as shown in Table 9(b).

As shown in Table 9(b), according to the picture conversion apparatus 100 according to the first embodiment of the present invention, a difference in luminance from a current signal on the interpolation line can be suppressed to not more than a value "40". This value can be made significantly smaller, as compared with a value "90" which is a difference from the current signal on the interpolation line in the prior art shown in Table 4(b).

That is, according to the present embodiment, it is possible to significantly alleviate the problem in the prior art that moving picture processing is liable to be performed when the picture slowly moves in the vertical direction so that the picture quality thereof is liable to be degraded.

The picture conversion apparatus 100 according to the present embodiment can perform accurate motion detection because it can compare the progressive video field signal P1 and the progressive video field signal P2 which differ in fields to be bases, and outputs the result of the comparison as the motion amount information M. Further, the picture conversion apparatus 100 can make accurate motion judgment even in cases such as a case where a picture having a large luminance difference in the vertical direction slowly moves, thereby making it possible to provide a video which is stable and has a high resolution.

In the present embodiment, the progressive video field signal P2 is generated from the interlaced video signals V1, a, and b out of the four interlaced video signals V1, a, b, and c successively delayed field by field, and the progressive video field signal P1 is generated from the interlaced video signals a, b, and c. The first progressive video field signal P1 and the progressive video field signal P2 are compared with each other.

The generation of the progressive video field signal P1 and the progressive video field signal P2 is not limited to the generation by the four interlaced video signals successively delayed field by field. For example, the progressive video field signal P1 may be generated by the interlaced video signal V1 and the interlaced video signal a out of the interlaced video signals V1, a, and b, and the progressive video field signal P2 may be generated by the interlaced video signals a and b. Consequently, the amount of data stored in a field memory can be reduced, thereby making it possible to provide a high-performance picture conversion apparatus at low cost.

In the present embodiment, the interlaced video signal a is used as the current line in the progressive video field signal P1, a value obtained by operating the interlaced video signal V1 and the interlaced video signal b is used as the interpolation line, a field signal of the interlaced video signal b is used as the current line in the progressive video field signal P2, and a value obtained by operating the interlaced video signal V1 and the interlaced video signal c is used as the interpolation line.

Even if the interlaced video signals slightly move, therefore, the relative motion amounts are exerted on the interpolation line such that they are canceled by the operation of the interlaced video signals V1 and b or the operation of the interlaced video signals a and b. Even if a picture moves, therefore, it can be accurately judged whether the picture is a "still picture" or a "moving picture", and the picture quality thereof can be improved with high precision, thereby making it possible to provide a progressive video signal of a higher picture quality.

Furthermore, in operating a signal on an interpolation line, a corresponding pixel in a corresponding interlaced video signal and a pixel peripheral thereto are included in the operation. Consequently, the progressive video field signal P1 and the progressive video field signal P2 which have tolerance for noise and have higher precision can be generated, thereby making it possible to perform higher-precision motion detection.

Furthermore, in operating a signal on an interpolation line, an average of corresponding pixels in corresponding interlaced video signals is operated. Therefore, the circuit scale can be simplified so that a low-cost circuit can be realized.

The comparison circuit 6 is for comparing the values of the corresponding pixels in the progressive video field signal P1 generated by the first progressive video generation circuit 4 and the progressive video field signal P2 generated by the second progressive video generation circuit 5 and comparing for each pixel the values of the corresponding pixels and pixels peripheral thereto, to output the respective results of the comparison as motion amounts M.

In this case, the comparison by the comparison circuit 6 includes not only the corresponding pixels but also the pixels peripheral thereto, thereby making it possible to perform motion detection with higher precision.

Generally in some cases, the interlaced video signal is referred to as an interlaced video field signal, and the progressive video signal is particularly referred to as a progressive picture frame signal.

In the description of the embodiment of the present invention, an intermediate progressive video signal which has not been finally outputted yet is referred to as a progressive video field signal because it is a signal for processing a television video in units of fields. As to this term, if particularly the field signal is referred to as a composite frame signal, it is unchanged in meaning. That is, in the present invention, if the progressive video field signal is referred to as a progressive picture frame signal, it is unchanged in meaning. The present invention is not limited to the term "progressive video field signal". That is, the progressive video field signal refers to a progressive video signal generated from an interlaced video field signal.

In the present embodiment, the first one-field delay circuit 1, the second one-field delay circuit 2, the third one-field delay circuit 3, the first progressive video generation circuit 4 and the second progressive video generation circuit 5 correspond to an interpolation circuit, the first one-field delay circuit 1, the second one-field delay circuit 2, and the third one-field delay circuit 3 correspond to an interlace generation circuit, the progressive video field signal P1 corresponds to a first progressive signal, the first progressive video generation circuit 4 corresponds to a first progressive circuit, the progressive video field signal P2 corresponds to a second progressive signal, and the second progressive video generation circuit 5 corresponds to a second progressive circuit.

Furthermore, the comparison circuit 6 corresponds to a motion calculation circuit, the frame interfiled interpolation circuit 7 corresponds to a still picture processing circuit, the intra-field interpolation signal F2 corresponds to a moving picture progressive signal, the intra-field interpolation circuit 8 corresponds to a moving picture processing circuit, and the interlaced video signals V1, a, b, and c respectively correspond to first to fourth interlaced video signals.

Second Embodiment

A picture conversion apparatus according to a second embodiment will be described. In the picture conversion apparatus according to the second embodiment, a plurality of virtual pixels are newly generated between lines in the progressive video field signal P1 and the progressive video field signal P2 which are respectively generated by the first progressive video generation circuit 4 and the second progressive video generation circuit 5 shown in FIG. 1.

As a result, the picture conversion apparatus according to the second embodiment can detect motion information more precisely on the basis of the plurality of virtual pixels even when a picture slowly moves at a rate of not more than one line per field, as compared with the picture conversion apparatus 100 according to the first embodiment, as well as to realize optimum control of still picture processing and moving picture processing.

Figure 7:
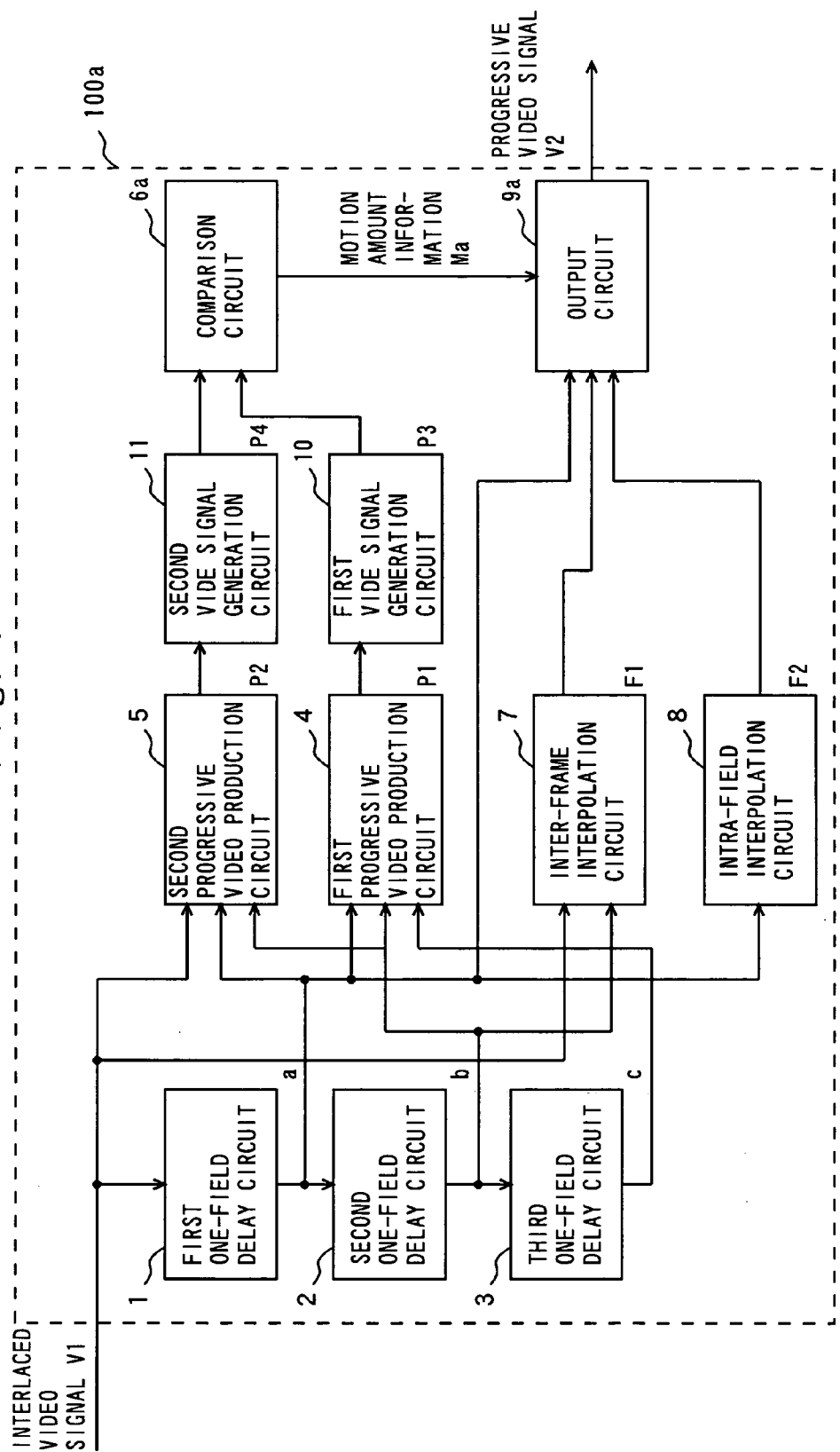
FIG. 7 is a block diagram showing a picture conversion apparatus according to a second embodiment.

FIG. 7 is a block diagram showing the picture conversion apparatus according to the second embodiment of the present invention. The picture conversion apparatus 100a according to the second embodiment differs from the picture conversion apparatus 100 according to the first embodiment shown in FIG. 1 in the following points.

The picture conversion apparatus 10a according to the second embodiment further comprises a first video signal generation circuit 10 and a second video signal generation circuit 11 in addition to the configuration of the picture conversion apparatus 100 according to the first embodiment.

Furthermore, the picture conversion apparatus 100a according to the second embodiment comprises a comparison circuit 6a in place of the comparison circuit 6 in the picture conversion apparatus 100 according to the first embodiment, and comprises an output circuit 9a in place of the output circuit 9 in the picture conversion apparatus 100 according to the first embodiment.

Other constituent elements of the picture conversion apparatus 100a according to the second embodiment are the same as the constituent elements of the picture conversion apparatus 100 according to the first embodiment and hence, the same constituent elements are assigned the same reference numerals.

Description is now made of the different points of the picture conversion apparatus 100a according to the second embodiment from the picture conversion apparatus 100 according to the first embodiment.

The first video signal generation circuit 10 in the picture conversion apparatus 100a according to the second embodiment newly generates pixels between pixels in a progressive video field signal P1 outputted from a first progressive video generation circuit 4. Further, the second video signal generation circuit 11 newly generates pixels between pixels in a progressive video field signal P2 outputted from the second progressive video generation circuit 5.

The comparison circuit 6a then compares the values of corresponding pixels in a newly generated progressive video field signal P3 outputted from the first video signal generation circuit 10 and a newly generated progressive video field signal P4 outputted from the second video signal generation circuit 11, or compares the values of the corresponding pixels and pixels peripheral thereto, and outputs the result of the comparison as motion amount information Ma.

Description is now made of the configurations of the first video signal generation circuit 10 and the second video signal generation circuit 11.

Figure 8:
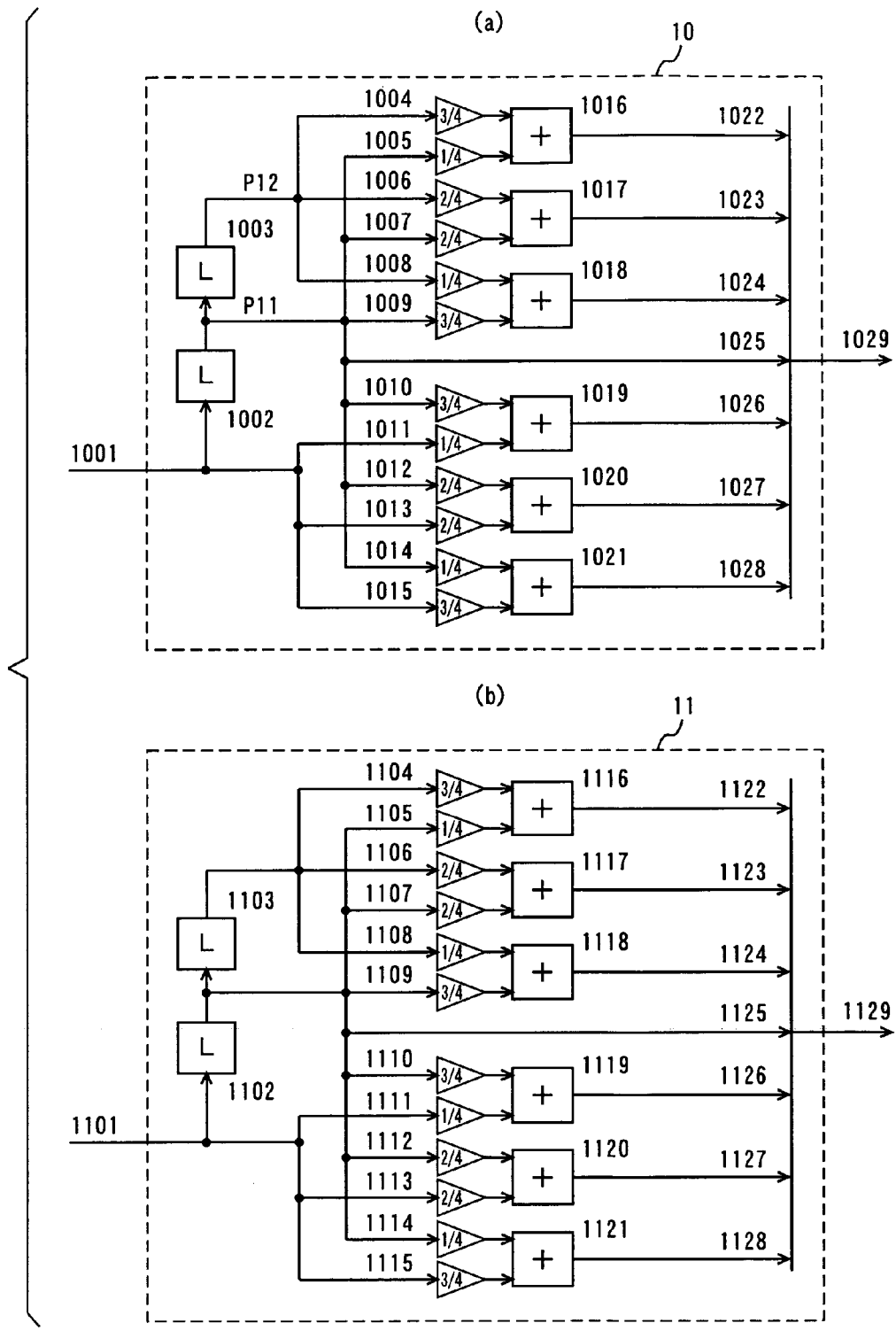
FIG. 8(a) is a diagram showing the configuration of a first video signal generation circuit 10.
FIG. 8(b) is a diagram showing the configuration of a second video signal generation circuit.

FIG. 8(a) is a diagram showing the configuration of the first video signal generation circuit 10, and FIG. 8(b) is a diagram showing the configuration of the second video signal generation circuit 11.

As shown in FIG. 8(a), the first video signal generation circuit 10 comprises one-line delay circuits 1002 and 1003, multiplication circuits 1004, 1005, . . . , 1015, and addition circuits 1016, 1017, . . . , 1021.

Furthermore, the respective multiplication factors of the multiplication circuits 1005, 1008, 1011, and 1014 are set to one-fourth. The respective multiplication factors of the multiplication circuits 1006, 1007, 1012, and 1013 are set to two-fourths. The respective multiplication factors of the multiplication circuits 1004, 1009, 1010, and 1015 are set to three-fourths.

As shown in FIG. 8(b), the second video signal generation circuit 11 comprises one-line delay circuits 1102 and 1103, multiplication circuits 1104, 1105, . . . , 1115, and addition circuits 1116, 1117, . . . , 1121.

Furthermore, the respective multiplication factors of the multiplication circuits 1105, 1108, 1111, and 1114 are set to one-fourth. The respective multiplication factors of the multiplication circuits 1106, 1107, 1112, and 1113 are set to two-fourths. The respective multiplication factors of the multiplication circuits 1104, 1109, 1110, and 1115 are set to three-fourths.

Description is now made of the operations of the first video signal generation circuit 10 using FIG. 8(a).

The progressive video field signal P1 outputted from the first progressive video generation circuit 4 is fed to an input terminal 1001. The progressive video field signal P1 fed to the input terminal 1001 is fed to the one-line delay circuit 1002.

The one-line delay circuit 1002 delays the progressive video field signal P1 by one line, to generate a progressive video field signal P11, and feeds the generated progressive video field signal P11 to the one-line delay circuit 1003. The one-line delay circuit 1003 delays the progressive video field signal P11 by one line, to generate a progressive video field signal P12.

The progressive video field signal P1 fed to the input terminal 1001 is respectively fed to the multiplication circuits 1011, 1013, and 1015. The progressive video field signal P11 generated by the one-line delay circuit 1002 is respectively fed to the multiplication circuits 1005, 1007, 1009, 1010, 1012, and 1014. The progressive video field signal P12 generated by the one-line delay circuit 1003 is respectively fed to the multiplication circuits 1004, 1006, and 1008.

In the multiplication circuit 1004, the fed progressive video field signal P12 is multiplied by the set multiplication factor, and the result of the multiplication is outputted to the addition circuit 1016. In the multiplication circuit 1005, the fed progressive video field signal P11 is multiplied by the set multiplication factor, and the result of the multiplication is outputted to the addition circuit 1016. In the multiplication circuit 1006, the fed progressive video field signal P12 is multiplied by the set multiplication factor, and the result of the multiplication is outputted to the addition circuit 1017.

In the multiplication circuit 1007, the fed progressive video field signal P11 is multiplied by the set multiplication factor, and the result of the multiplication is outputted to the addition circuit 1017. In the multiplication circuit 1008, the fed progressive video field signal P12 is multiplied by the set multiplication factor, and the result of the multiplication is outputted to the addition circuit 1018. In the multiplication circuit 1009, the fed progressive video field signal P11 is multiplied by the set multiplication factor, and the result of the multiplication is outputted to the addition circuit 1018. In the multiplication circuit 1010, the fed progressive video field signal P11 is multiplied by the set multiplication factor, and the result of the multiplication is outputted to the addition circuit 1019.

In the multiplication circuit 1011, the fed progressive video field signal P1 is multiplied by the set multiplication factor, and the result of the multiplication is outputted to the addition circuit 1019. In the multiplication circuit 1012, the fed progressive video field signal P11 is multiplied by the set multiplication factor, and the result of the multiplication is outputted to the addition circuit 1020. In the multiplication circuit 1013, the fed progressive video field signal P1 is multiplied by the set multiplication factor, and the result of the multiplication is outputted to the addition circuit 1020. In the multiplication circuit 1014, the fed progressive video field signal P11 is multiplied by the set multiplication factor, and the result of the multiplication is outputted to the addition circuit 1021. In the multiplication circuit 1015, the fed progressive video field signal P1 is multiplied by the set multiplication factor, and the result of the multiplication is outputted to the addition circuit 1021.

Subsequently, in the addition circuit 1016, output signals of the multiplication circuit 1004 and the multiplication circuit 1005 are added together, and a progressive video field signal is outputted from an output terminal 1022. In the addition circuit 1017, output signals of the multiplication circuit 1006 and the multiplication circuit 1007 are added together, and a progressive video field signal is outputted from an output terminal 1023. In the addition circuit 1018, output signals of the multiplication circuit 1008 and the multiplication circuit 1009 are added together, and a progressive video field signal is outputted from an output terminal 1024.

In the addition circuit 1019, output signals of the multiplication circuit 1010 and the multiplication circuit 1011 are added together, and a progressive video field signal is outputted from an output terminal 1026. In the addition circuit 1020, output signals of the multiplication circuit 1012 and the multiplication circuit 1013 are added together, and a progressive video field signal is outputted from an output terminal 1027. In the addition circuit 1021, output signals of the multiplication circuit 1014 and the multiplication circuit 1015 are added together, and a progressive video field signal is outputted from an output terminal 1028. The progressive video field signal P11 of the one-line delay circuit 1002 is outputted from an output terminal 1025. In the first video signal generation circuit 10 shown in FIG. 8(a), the progressive video field signals outputted from the output terminals 1022, . . . , 1028 are outputted from an output terminal 1029.

The above-mentioned first video signal generation circuit 10 is operated on the basis of a signal from a timing generation circuit (not shown). The signal from the timing generation circuit is generated at timing at which an interpolation line in the progressive video field signal P1 generated by the progressive video generation circuit 4 is outputted from the one-line delay circuit 1002.

At this time, a value which is one-fourth of the value of a pixel on an interpolation line to be paid attention to (hereinafter referred to as an object interpolation line) and a value which is three-fourths of the value of a pixel on a current line above the interpolation line are added together, and the result of the addition is outputted to the output terminal 1022. Consequently, a pixel at a distance which is three-fourths of one line from the pixel on the object interpolation line to the pixel on the current line above the interpolation line is generated.

Similarly, a value which is two-fourth of the value of the pixel on the object interpolation line and a value which is two-fourths of the value of the pixel on the current line above the interpolation line are added together, and the result of the addition is outputted to the output terminal 1023. Consequently, a pixel at a distance which is two-fourths of one line from the pixel on the object interpolation line to the pixel on the current line above the interpolation line is generated.

Furthermore, a value which is three-fourth of the value of the pixel on the object interpolation line and a value which is one-fourth of the value of the pixel on the current line above the interpolation line are added together, and the result of the addition is outputted to the output terminal 1024. Consequently, a pixel at a distance which is one-fourth of one line from the pixel on the object interpolation line to the pixel on the current line above the interpolation line is generated.

Furthermore, the value which is three-fourths of the value of the pixel on the object interpolation line and a value which is one-fourth of the value of a pixel on a current line below the interpolation line are added together, and the result of the addition is outputted to the output terminal 1026. Consequently, a pixel at a distance which is one-fourth of one line from the pixel on the object interpolation line to the pixel on the current line below the interpolation line is generated.

Furthermore, the value which is two-fourths of the value of the pixel on the object interpolation line and a value which is two-fourths of the value of the pixel on the current line below the interpolation line are added together, and the result of the addition is outputted to the output terminal 1027. Consequently, a pixel at a distance which is two-fourths of one line from the pixel on the object interpolation line to the pixel on the current line below the interpolation line is generated.

Furthermore, the value which is one-fourth of the value of the pixel on the object interpolation line and a value which is three-fourths of the value of the pixel on the current line below the interpolation line are added together, and the result of the addition is outputted to the output terminal 1028. Consequently, a pixel at a distance which is three-fourths of one line from the pixel on the object interpolation line to the pixel on the current line below the interpolation line is generated.

An example of an output of the first video signal generation circuit 10 and an example of an output of the second video signal generation circuit 11 are shown in Table 10.

TABLE 10(a)

Example of Video Signal Generation Circuit
(a) Example of Output of Video Signal Generation Circuit 10

|   | f3 | f4 | f5 | f6 | f7 | f8 | f9 |
|---|---|---|---|---|---|---|---|
| L | 218 | 128 | 37 | 37 | 37 | 128 | 218 |
| L + 0.25 | 159 | 76 | 60 | 44 | 96 | 179 | 195 |
| L + 0.50 | 191 | 114 | 82 | 51 | 64 | 141 | 173 |
| L + 0.75 | 223 | 153 | 105 | 57 | 32 | 102 | 150 |
| L + 1 | 255 | 191 | 128 | 64 | 0 | 64 | 128 |
| L + 1.25 | 223 | 198 | 150 | 102 | 32 | 57 | 105 |
| L + 1.50 | 191 | 204 | 173 | 141 | 64 | 51 | 82 |
| L + 1.75 | 159 | 211 | 195 | 179 | 96 | 44 | 60 |
| L + 2 | 37 | 128 | 218 | 218 | 218 | 128 | 37 |
| L + 2.25 | 96 | 179 | 195 | 211 | 159 | 76 | 60 |
| L + 2.50 | 64 | 141 | 173 | 204 | 191 | 114 | 82 |
| L + 2.75 | 32 | 102 | 150 | 198 | 223 | 153 | 105 |
| L + 3 | 0 | 64 | 128 | 191 | 255 | 191 | 128 |
| L + 3.25 | 32 | 57 | 105 | 153 | 223 | 198 | 150 |
| L + 3.50 | 64 | 51 | 82 | 114 | 191 | 204 | 173 |
| L + 3.75 | 96 | 44 | 60 | 76 | 159 | 211 | 195 |
| L + 4 | 218 | 128 | 37 | 37 | 37 | 128 | 218 |
| L + 4.25 | 159 | 76 | 60 | 44 | 96 | 179 | 195 |
| L + 4.50 | 191 | 114 | 82 | 51 | 64 | 141 | 173 |
| L + 4.75 | 223 | 153 | 105 | 57 | 32 | 102 | 150 |
| L + 5 | 255 | 191 | 128 | 64 | 0 | 64 | 128 |
| L + 5.25 | 223 | 198 | 150 | 102 | 32 | 57 | 105 |
| L + 5.50 | 191 | 204 | 173 | 141 | 64 | 51 | 82 |
| L + 5.75 | 159 | 211 | 195 | 179 | 96 | 44 | 60 |
| L + 6 | 37 | 128 | 218 | 218 | 218 | 128 | 37 |
| L + 6.25 | 96 | 179 | 195 | 211 | 159 | 76 | 60 |
| L + 6.50 | 64 | 141 | 173 | 204 | 191 | 114 | 82 |
| L + 6.75 | 32 | 102 | 150 | 198 | 223 | 153 | 105 |
| L + 7 | 0 | 64 | 128 | 191 | 255 | 191 | 128 |

TABLE 10(b)

(b) Example of Output of Video Signal Generation Circuit 11

|   | f3 | f4 | f5 | f6 | f7 | f8 | f9 |
|---|---|---|---|---|---|---|---|
| L | 128 | 37 | 37 | 37 | 128 | 218 | 218 |
| L + 0.25 | 159 | 76 | 60 | 44 | 96 | 179 | 195 |
| L + 0.50 | 191 | 114 | 82 | 51 | 64 | 141 | 173 |
| L + 0.75 | 223 | 153 | 105 | 57 | 32 | 102 | 150 |
| L + 1 | 255 | 191 | 128 | 64 | 0 | 64 | 128 |
| L + 1.25 | 223 | 198 | 150 | 102 | 32 | 57 | 105 |
| L + 1.50 | 191 | 204 | 173 | 141 | 64 | 51 | 82 |
| L + 1.75 | 159 | 211 | 195 | 179 | 96 | 44 | 60 |
| L + 2 | 128 | 218 | 218 | 218 | 128 | 37 | 37 |
| L + 2.25 | 96 | 179 | 195 | 211 | 159 | 76 | 60 |
| L + 2.50 | 64 | 141 | 173 | 204 | 191 | 114 | 82 |
| L + 2.75 | 32 | 102 | 150 | 198 | 223 | 153 | 105 |
| L + 3 | 0 | 64 | 128 | 191 | 255 | 191 | 128 |
| L + 3.25 | 32 | 57 | 105 | 153 | 223 | 198 | 150 |
| L + 3.50 | 64 | 51 | 82 | 114 | 191 | 204 | 173 |
| L + 3.75 | 96 | 44 | 60 | 76 | 159 | 211 | 195 |
| L + 4 | 128 | 37 | 37 | 37 | 128 | 218 | 218 |
| L + 4.25 | 159 | 76 | 60 | 44 | 96 | 179 | 195 |
| L + 4.50 | 191 | 114 | 82 | 51 | 64 | 141 | 173 |
| L + 4.75 | 223 | 153 | 105 | 57 | 32 | 102 | 150 |
| L + 5 | 255 | 191 | 128 | 64 | 0 | 64 | 128 |
| L + 5.25 | 223 | 198 | 150 | 102 | 32 | 57 | 105 |
| L + 5.50 | 191 | 204 | 173 | 141 | 64 | 51 | 82 |
| L + 5.75 | 159 | 211 | 195 | 179 | 96 | 44 | 60 |
| L + 6 | 128 | 218 | 218 | 218 | 128 | 37 | 37 |
| L + 6.25 | 96 | 179 | 195 | 211 | 159 | 76 | 60 |
| L + 6.50 | 64 | 141 | 173 | 204 | 191 | 114 | 82 |
| L + 6.75 | 32 | 102 | 150 | 198 | 223 | 153 | 105 |
| L + 7 | 0 | 64 | 128 | 191 | 255 | 191 | 128 |

Table 10(a) shows an output signal from the output terminal 1029 of the first video signal generation circuit 10, and Table 10(b) shows an output signal from the output terminal 1129 of the second video signal generation circuit 11.

When the first video signal generation circuit 10 calculates a pixel on the (L+1.25)-th line between the (L+2)-th line and the (L+1)-th line in the f4-th field, as shown in Table 10 (a), it adds a value "191.25" which is three-fourths of the value "255" of a pixel on the (L+1)-th line and a value "32" which is one-fourth of a value "128" of a pixel on the (L+2)-th line together, and calculates the sum "233.25". The first video signal generation circuit 10 selects "223" as a value nearest to the calculated sum "223.25", and outputs the selected value as the value of the pixel on the (L+1.25)-th line in the f4-th field.

When the second video signal generation circuit 11 calculates a pixel on the (L+4.25)-th line between the (L+4)-th line and the (L+5)-th line in the f5-th field, as shown in Table 10 (b), for example, it adds a value "27.75" which is three-fourths of the value "37" of a pixel on the (L+4)-th line and a value "32" which is one-fourth of the value "128" of a pixel on the (L+5)-th line together, and calculates the sum "59.75". The second video signal generation circuit 11 selects "60" as a value nearest to the calculated sum "59.75", and outputs the selected value as the value of the pixel on the (L+4.25)-th line in the f5-th field. In such way, the values of pixels on the other lines are calculated and outputted.

In the first video signal generation circuit 10 and the second video signal generation circuit 11, the above-mentioned operations are respectively performed, so that the progressive video field signals P3 and P4 obtained by respectively adding newly generated pixels to the progressive video field signals P1 and P2 are outputted to the comparison circuit 6*a*.

Figure 9:
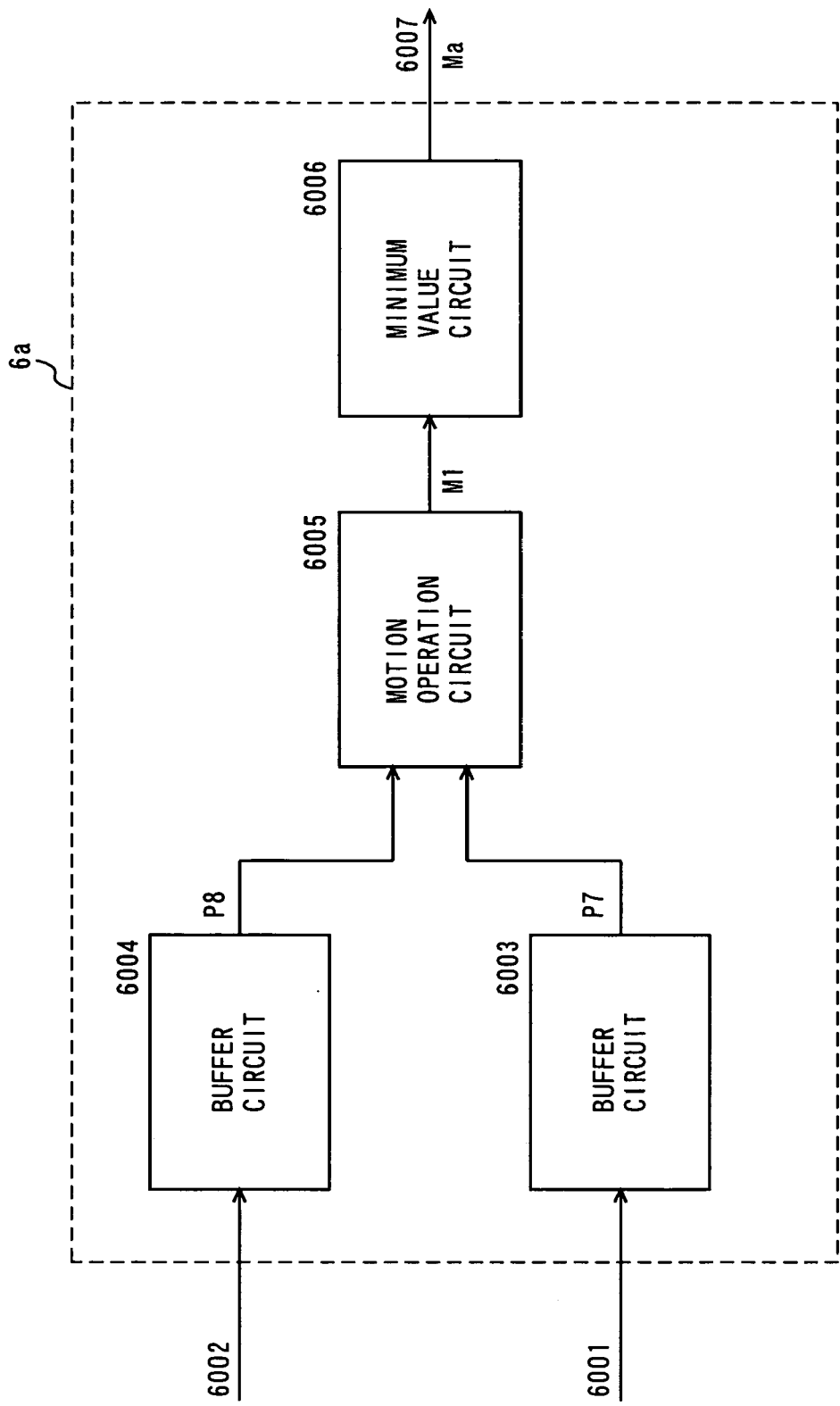
FIG. 9 is a block diagram showing the internal configuration of a comparison circuit.

The configuration and the operations of the comparison circuit 6a will be then described. FIG. 9 is a block diagram showing the internal configuration of the comparison circuit 6a.

The comparison circuit 6a comprises buffer circuits 6003 and 6004, a motion operation circuit 6005, and a minimum value circuit 6006.

The progressive video field signal P3 is fed to an input terminal 6001 of the comparison circuit 6a from the first video signal generation circuit 10, and the progressive video field signal P4 is fed to the input terminal 6002 from the second video signal generation circuit 6002.

The progressive video field signals P3 and P4 fed from the input terminals 6001 and 6002 are respectively fed to the buffer circuits 6003 and 6004. The buffer circuits 6003 and 6004 respectively store the progressive video field signals P3 and P4 at predetermined intervals, and respectively feed the progressive video field signals P7 and P8 to the motion operation circuit 6005 after an elapse of the predetermined time interval. The motion operation circuit 6005 compares, in the progressive video field signals P7 and P8 respectively fed from the buffer circuits 6003 and 6004, the values of corresponding pixels or the values of the corresponding pixels and pixels peripheral thereto, and outputs the result of the comparison as a motion amount M1.

The minimum value circuit 6006 selects the minimum value from the motion amount M1 outputted from the motion operation circuit 6005, and outputs the selected minimum value as motion amount information Ma from an output terminal 6007.

Description is now made of an example of the operations of the motion operation circuit 6005. The motion operation circuit 6005 performs motion detection on the basis of the inputted progressive video field signals.

First, in the motion operation circuit 6005, the progressive video field signals P7 and P8 having pixels newly generated therein are respectively fed from the buffer circuits 6003 and 6004.

In the motion operation circuit 6005, the motion detection is performed in the following manner on the basis of a total of seven pixels, i.e., one pixel on the (L+3)-th line, three pixels above the (L+3)-th line, and three pixels below the (L+3)-th line in the f4-th field in the progressive video field signal.

The value of the pixel on the (L+3)-th line in the f4-th field is found by adding the absolute values of the respective differences between the values of pixels on the (L+2.25)-th line to the (L+3.75)-th line in the f4-th field shown in Table 10(a) and the values of pixels on the (L+2.25)-th line to the (L+3.75)-th line in the f4-th field shown in Table (b).

That is, the value of the pixel on the (L+3)-th line in the f4-th field is expressed by the following equation:

$$((|96-179|)+|(64-141)|+ \qquad \text{Equation 1}$$
$$|(32-102)|+|(0-64)|+|(32-57)|+$$
$$|(64-51)|+|(96-44)|)/7 \approx 54.857 = 55$$

The value in the foregoing equation is the minimum value in a case where a picture does not move at all but stands still. When the pixel on the (L+3)-th line in the f4-th field assumes a small value, for example, it can be judged that the picture is not changed in the vicinity of the pixel. Therefore, it can be presumed that the picture is a still picture.

Furthermore, the value of a pixel on a line one line above the (L+3)-th line in the f4-th field is found by adding the absolute values of the respective differences between the values of pixels on the (L+2)-th line to the (L+3.50)-th line in the f4-th field shown in Table (a) and the values of pixels on the (L+2.25)-th line to the (L+3.75)-th line in the f4-th field shown in Table 10(b).

In the following, the distance between two lines adjacent on the upper and lower sides in the same field is represented as one pixel per field, and one-half of the distance between the two lines is represented as a 0.5 pixel field, one-fourth of the distance between the two lines is represented as a 0.25 pixel field, and three-fourths of the distance between the two lines is represented as a 0.75 pixel field.

That is, the value of the pixel on the line one line above the (L+3)-th line in the f4-th field is expressed by the following equation:

$$(|128-179|+|(96-141)|+|(64-102)|+|(32-64)|+ \qquad \text{Equation 2}$$
$$|(0-57)|+|(32-51)|+|(64-44)|)/7 \approx 37.429 = 38$$

The value in the foregoing equation is the minimum value in a case where a picture moves at a rate of 0.25 pixels per field in the downward line direction.

Furthermore, the value of a pixel on a line two lines above the (L+3)-th line in the f4-th field is found by adding the absolute values of the respective differences between the values of pixels on the (L+1.75)-th line to the (L+3.25)-th line in the f4-th field shown in Table 10(a) and the values of pixels on the (L+2.25)-th line to the (L+3.75)-th line in the f4-th field shown in Table (b).

That is, the value of the pixel on the line two lines above the (L+3)-th line in the f4-th field is expressed by the following equation:

$$(|159-179|+|(128-141)|+|(96-102)|+|(64-64)|+ \qquad \text{Equation 3}$$
$$|(32-57)|+|(0-51)|+|(32-44)|)/7 \approx 18.142 = 18$$

The value in the foregoing equation is the minimum value in a case where a picture moves at a rate of 0.50 pixels per field in the downward line direction.

Thus, the value of the pixel on the (L+3)-th line in the f4-th field is calculated as "55", the value of the pixel on the line one line above the (L+3)-th line in the f4-th field is calculated as "38", and the value of the pixel on the line two lines above the (L+3)-th line in the f4-th field is calculated as "18". Similarly, the value of a pixel on a line three lines above the (L+3)-th line in the f4-th field is calculated as "22", the value of a pixel on a line one line below the (L+3)-th line in the f4-th field is calculated as "71", the value of a pixel on a line two lines below the (L+3)-th line in the f4-th field is calculated as "84", and the value of a pixel on a line three lines below the (L+3)-th line in the f4-th field is calculated as "98".

The value of the pixel on the (L+3)-th line in the f4-th field, the value of the pixel on the line one line above the (L+3)-th line, the value of the pixel on the line two lines above the (L+3)-th line, the value of the pixel on the line three lines above the (L+3)-th line, the value of the pixel on the line one line below the (L+3)-th line, the value of the pixel on the line two lines below the (L+3)-th line, and the value of the pixel on the line three lines below the (L+3)-th line are respectively minimum values in cases where respective motion amounts are 0.75 pixels per field in the downward direction, 0.50 pixels per field in the downward direction, 0.25 pixels per field in the downward direction, zero, 0.25 pixels per field in the upward direction, 0.50 pixels per field in the upward direction, and 0.75 pixels per field in the upward direction.

As described in the foregoing manner, in the motion operation circuit 6005, a motion amount and motion direction and its likelihood are calculated on the basis of a correlation between the progressive video field signals P7 and P8, and are outputted as a motion amount M1. The results of the output of the motion amount M1 in the above-mentioned motion operation circuit 6005 are shown in Table 11(a):

TABLE 11(a)

Example of Output of Motion Operation Circuit 6005 and Example of Output of Comparison Circuit 6a
(a) Example of Output of Motion Operation Circuit 6005

|   | f3 | f4 | f5 | f6 | f7 | f8 | f9 |
|---|---|---|---|---|---|---|---|
| L |  |  |  |  |  |  |  |
|   |  |  |  |  |  |  |  |
|   |  |  |  |  |  |  |  |
| L+1 |  |  |  |  |  |  |  |
|   |  |  | 28 |  | 17 |  | 28 |
|   |  |  | 18 |  | 15 |  | 18 |
|   |  |  | 17 |  | 38 |  | 17 |
| L+2 |  |  | 27 |  | 59 |  | 27 |
|   |  |  | 22 | 52 | 26 | 73 | 22 | 52 |
|   |  |  | 18 | 71 | 14 | 86 | 18 | 71 |
|   |  |  | 38 | 84 | 18 | 99 | 38 | 84 |
| L+3 |  |  | 55 |  | 36 |  | 55 |
|   |  |  | 71 | 28 | 59 | 17 | 71 | 28 |
|   |  |  | 84 | 18 | 75 | 15 | 84 | 18 |
|   |  |  | 98 | 17 | 87 | 38 | 98 | 17 |
| L+4 |  |  | 27 |  | 59 |  | 27 |
|   |  |  | 22 | 52 | 26 | 73 | 22 | 52 |
|   |  |  | 18 | 71 | 14 | 86 | 18 | 71 |
|   |  |  | 38 | 84 | 18 | 99 | 38 | 84 |
| L+5 |  |  | 55 |  | 36 |  | 55 |
|   |  |  | 71 |  | 59 |  | 71 |
|   |  |  | 84 |  | 75 |  | 84 |
|   |  |  | 98 |  | 87 |  | 98 |
| L+6 |  |  |  |  |  |  |  |
|   |  |  |  |  |  |  |  |
|   |  |  |  |  |  |  |  |
| L+7 |  |  |  |  |  |  |  |

As shown in Table 11(a), out of three columns and three columns, respectively, above and below the column of (L+3)-th line in the f4-th field, the column showing a motion amount of 0.50 pixels per field above the (L+3)-th line gives the minimum value "18", for example. As a result, the motion amount and motion direction of the progressive video field signal is 0.50 pixels per field in the downward direction, and its likelihood is "18".

Although in the picture conversion apparatus 100a according to the second embodiment, the motion amount and motion direction and its likelihood are judged on the basis of the minimum of the values of the outputs of the motion operation circuit 6005, the present invention is not limited to the same. For example, a predetermined threshold value may be set, to judge, when the minimum of the values in the seven columns is not more than the predetermined threshold value, that the motion amount is small.

When the predetermined threshold value is set to "20", for example, a column in which the motion amount is "20" or less exists on the line two lines above the column of (L+3)-th line in the f4-th field from Table 11(a). Accordingly, it can be judged that the motion amount and motion direction is 0.5 pixels per field in the downward direction on the basis of a correlation between the progressive video field signals P7 and P8. As a result, information outputted to the output circuit 9 can be reduced, thereby making it possible to simplify the output circuit 9.

In such a way, the motion operation circuit 6005 calculates the motion amounts of 0.25 pixels per field, 0.5 pixels per field, and 0.75 pixels per field and their likelihoods, and respectively feeds the motion amounts and the likelihoods as motion amounts M1 to the minimum value circuit 6006.

The minimum value circuit 6006 selects the minimum of the motion amounts M1, fed from the motion operation circuit 6005, at pixels on an object interpolation line, and outputs the motion amount information Ma to the output terminal 6007.

For example, in an interpolation line which is the (L+3)-th line in the f4-th field shown in Table 11(a), "18" in a column, on a line two lines above the interpolation line, showing a downward motion amount of five pixels per field is selected. That is, as shown in Table 11 (b), a value indicating that the motion amount is 0.5 pixels per field in the downward direction and its likelihood is "18" is outputted.

As described in the foregoing, the smaller the selected value is, the higher the probability of the motion amount and motion direction at the pixel on the object interpolation line is.

TABLE 11(b)

(b) Example of Output of Comparison Circuit 6a,

|   | f3 | f4 | f5 | f6 | f7 | f8 | f9 |
|---|---|---|---|---|---|---|---|
| L |  |  |  |  |  |  |  |
|   |  |  |  |  |  |  |  |
|   |  |  |  |  |  |  |  |
| L+1 |  |  |  |  |  |  |  |
|   |  |  |  |  |  | 15 |  |
|   |  |  |  |  | 17 |  | 17 |
| L+2 |  |  |  |  |  |  |  |
|   |  |  |  |  |  |  |  |
|   |  |  | 18 |  | 14 |  | 18 |
| L+3 |  |  |  |  |  |  |  |
|   |  |  |  |  |  |  |  |
|   |  |  |  |  |  | 15 |  |
|   |  |  |  |  | 17 |  | 17 |
| L+4 |  |  |  |  |  |  |  |
|   |  |  |  |  |  |  |  |
|   |  |  | 18 |  | 14 |  | 18 |
| L+5 |  |  |  |  |  |  |  |
|   |  |  |  |  |  |  |  |
|   |  |  |  |  |  |  |  |
| L+6 |  |  |  |  |  |  |  |
|   |  |  |  |  |  |  |  |
|   |  |  |  |  |  |  |  |
| L+7 |  |  |  |  |  |  |  |

Table 11(b) shows a value for each pixel on an interpolation line with respect to the above-mentioned minimum of the motion amounts. This value is outputted as the motion amount information Ma from the comparison circuit 6a.

In the picture conversion apparatus 100a according to the second embodiment, pixels are newly generated between lines, so that the progressive video field signal P3 and the progressive video field signal P4 each having a higher resolution are generated. The motion amount information Ma is calculated by the comparison circuit 6a on the basis of the progressive video field signals.

In the picture conversion apparatus 100a according to the second embodiment, high-precision motion detection can be performed, thereby making it possible to make the control of the output ratio of a moving picture to a still picture in the output circuit, described later, accurate, as well as to generate a progressive video field signal having a high resolution whose picture quality is hardly degraded.

The comparison circuit 6a in the picture conversion apparatus 100a according to the second embodiment compares the values of corresponding pixels and compares the values of the corresponding pixels and pixels peripheral thereto at the time of an operation, and outputs the respective results of the comparison as motion amounts. As a result, the peripheral pixels can be also used for the operation. Therefore, it is possible to improve the operation precision as well as to improve the detection precision of the motion amount of the progressive video field signal.

The relationship between pixels used at the time of an operation is not limited to that in the above-mentioned embodiment. For example, only an operation using corresponding pixels may be performed. Alternatively, only an operation using the corresponding pixels and pixels peripheral thereto may be performed. Further, both the operations may be together performed.

Although in the picture conversion apparatus 100a according to the second embodiment, the progressive video field signal P3 and the progressive video field signal P4 are generated, and the motion amount is operated on the basis of the progressive video field signals, the present invention is not limited to the same. Another comparing method may be used.

With respect to the progressive video field signal P3, for example, pixels newly generated are not used, and pixels which originally existed as the progressive video field signal P1 are used. The pixels which originally existed and the progressive video field signal P4 newly generated may be compared with each other.

Furthermore, with respect to the progressive video field signal P4, for example, pixels newly generated are not used, and pixels which originally existed as the progressive video field signal P2 are used. The pixels which originally existed and the third progressive video field signal P4 newly generated may be compared with each other.

In such a case, either one of the first video signal generation circuit 10 and the second video signal generation circuit 11 can be eliminated. Therefore, it is possible to reduce the circuit scale as well as to reduce the circuit cost.

In this case, the comparison circuit 6a compares corresponding pixels and the corresponding pixels and pixels peripheral thereto in the progressive video field signal P2 and the progressive video field signal P3, the progressive video field signal P1 and the progressive video field signal P4, and the progressive video field signal P3 and the progressive video field signal P4, and outputs the respective results of the comparison as motion amounts, thereby making it possible to calculate the motion amount information Ma.

Figure 10:
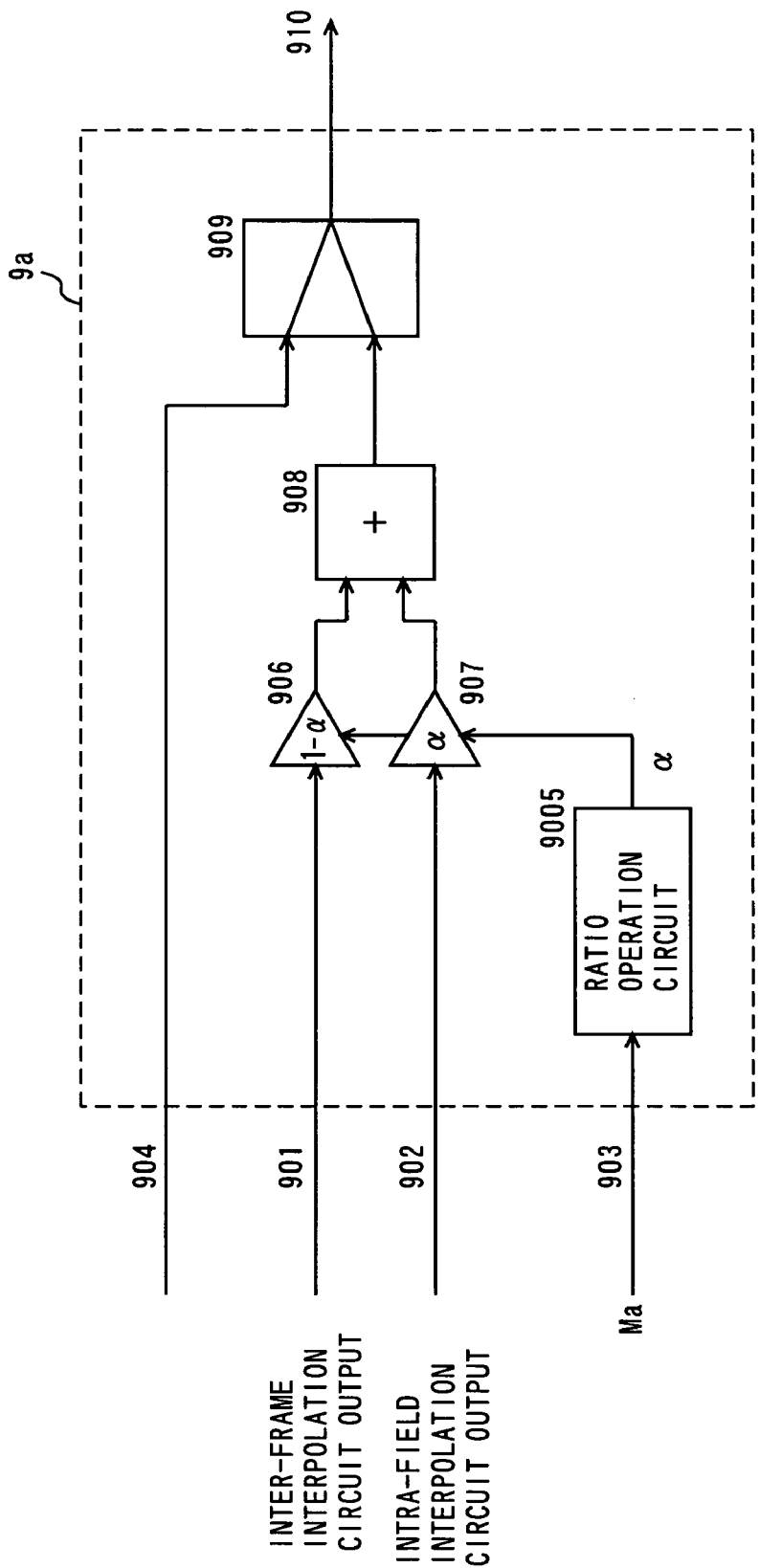
FIG. 10 is a diagram showing an example of the internal configuration of an output circuit.

Description is now made of the operations of the output circuit 9a. FIG. 10 is a diagram showing an example of the internal configuration of the output circuit 9a.

The output circuit 9a according to the second embodiment is the same as the output circuit 9 according to the first embodiment shown in FIG. 6 except that a ratio operation circuit 9005 is included in place of the ratio operation circuit 905 and hence, the same constituent elements are assigned the same reference numerals, and only different constituent elements will be described.

A numerical value representing a motion amount and motion direction and its likelihood from the comparison circuit 6a is fed to an input terminal 903 of the ratio operation circuit 905 shown in FIG. 10.

The ratio operation circuit 9005 judges that the ratio of a still picture is high when the fed numerical value representing a motion amount and motion direction and its likelihood is not more than a predetermined value. In this case, the ratio operation circuit 9005 makes a ratio value a small such that the ratio of a still picture becomes high.

For example, the ratio operation circuit 9005 sets the ratio value α in the following manner on the basis of the numerical value representing a motion amount and motion direction and its likelihood (hereinafter abbreviated as a numerical value representing a motion amount):

The ratio operation circuit 9005 outputs "0" as the ratio value α when the numerical value representing a motion amount is not more than "0.50", outputs "0.2" as the ratio value α when the numerical value representing a motion amount is not more than "0.75", outputs "0.5" as the ratio value α when the numerical value representing a motion amount is not more than "1.00", and outputs "1.0" as the ratio value α when the numerical value representing a motion amount is more than "1.00".

Furthermore, the ratio operation circuit 9005 may judge that the accurate motion amount and motion direction is extracted to use each of the above-mentioned conditions when the numerical value representing a motion amount is not more than "20", while judging that the motion amount and motion direction is indefinite to fix the ratio value α to "1.0" and output the ratio value when the numerical value representing a motion amount is more than "20".

When the values shown in Table 11(b) are fed to the ratio detection circuit 9005, therefore, all numerical values representing a motion amount are not more than "0.5". The ratio detection circuit 9005 outputs "0" as the ratio value α to multiplication circuits 906 and 907.

Although in the method of setting the ratio value α according to the second embodiment, the ratio value α is set such that the ratio of a still picture becomes high when the motion amount of a progressive video field signal is not more than 1.0 line, the present invention is not limited to the same. The ratio value of a still picture may be increased when the numerical value representing a motion amount is not more than "0.75", while being increased when the numerical value representing a motion amount is not more than "0.50".

In this case, the more accurate motion of the progressive video field signal can be found, and the state of the still picture can be strictly detected, thereby making it possible to improve the detection precision of a moving picture/still picture.

By the foregoing conditions, the output values of the output circuit 9a in a case where the ratio value α is set to zero when the numerical value representing a motion amount is not more than "0.50" are shown in Table 12(a):

TABLE 12(a)

Value of Output Circuit 9 and Difference between Output Value of Output Circuit 9 and Value of Original Video Signal
(a) Output of Output Circuit 9

|     | f3  | f4  | f5  | f6  | f7  | f8  | f9  |
| --- | --- | --- | --- | --- | --- | --- | --- |
| L   |     | 37  |     | 37  |     | 218 |     |
| L+1 | 255 |     | 128 |     | 0   |     | 128 |
| L+2 |     | 218 | 218 | 218 | 128 | 37  | 37  |
| L+3 | 0   | 64  | 128 | 191 | 255 | 191 | 128 |
| L+4 |     | 37  | 37  | 37  | 128 | 218 | 218 |
| L+5 | 255 | 191 | 128 | 64  | 0   | 64  | 128 |
| L+6 |     | 218 |     | 218 |     | 37  |     |
| L+7 | 0   |     | 128 |     | 255 |     | 191 |

With respect to a portion where the motion amount and motion direction is determined from Table 12(a), the value of a pixel to be interpolated is operated. The difference between the result of the operation in the portion and a signal which has not been interlaced yet is shown in Table 12(b):

TABLE 12(b)

(b) Difference between Output Value of Output Circuit 9 and Value of Original Video Signal

|     | f3  | f4  | f5  | f6  | f7  | f8  | f9  |
| --- | --- | --- | --- | --- | --- | --- | --- |
| L   |     |     |     |     |     |     |     |
| L+1 |     |     |     |     |     |     |     |
| L+2 |     |     | 37  |     | 0   |     | 37  |
| L+3 |     | 26  |     | 26  |     | 26  |     |
| L+4 |     |     | 37  |     | 0   |     | 37  |
| L+5 |     | 26  |     | 26  |     | 26  |     |
| L+6 |     |     |     |     |     |     |     |
| L+7 |     |     |     |     |     |     |     |

In Table 12(b), calculation is performed in consideration of a time difference of one field which is a delay in the output circuit 9a, similarly to the calculation shown in Table 9(b). Comparison between Table 12(b) and Table 9 (b) shows that an error in the 56-th field is decreased from "39" to "26".

As described in the foregoing, the picture conversion apparatus 100a according to the second embodiment can detect a moving picture or a still picture with higher precision and therefore, can convert a picture more accurately, as compared with the picture conversion apparatus 100 according to the first embodiment.

That is, it can be said that the picture conversion apparatus 100a according to the second embodiment more effectively solves the problem of the conventional motion adaptive progressive conversion apparatus that moving picture processing is liable to be performed when a picture slowly moves in the line direction so that the picture quality thereof is liable to be degraded, as compared with the picture conversion apparatus 100 according to the first embodiment.

In the picture conversion apparatus 100a, the values of corresponding pixels and the values of the corresponding pixels and pixels peripheral thereto are respectively compared with each other using the progressive video field signal P3 and the progressive video field signal P4 each having virtual pixels newly generated therein, and the respective results of the comparison are outputted and detected as motion amounts, thereby making it possible to perform higher-precision motion detection. Therefore, it is possible to generate a progressive video field signal having a high resolution whose picture quality is hardly degraded.

In newly generating pixels, the first video signal generation circuit 10 and the second video signal generation circuit 11 respectively newly generate pixels between lines in the progressive video field signals P3 and P4. In converting the interlaced video signal V1 into the progressive video field signal, precision in the vertical direction in which more strict conversion precision is required can be increased when the interlaced video signal V1 is converted into the progressive video field signal, and a circuit for newly generating pixels in the horizontal direction can be omitted, so that the increase in the circuit scale can be suppressed. Therefore, it is possible to provide a high-precision picture conversion apparatus at low cost.

In the description of the second embodiment of the present invention, the first one-field delay circuit 1, the second one-field delay circuit 2, the third one-field delay circuit 3, the first progressive video generation circuit 4, the second progressive video generation circuit 5, the first video signal generation circuit 10 and the second video signal generation circuit 11 correspond to an interpolation circuit, the first one-field delay circuit 1, the second one-field delay circuit 2, and the third one-field delay circuit 3 correspond to an interlace generation circuit, the progressive video field signal P1 corresponds to a first progressive signal, the first progressive video generation circuit 4 corresponds to a first progressive circuit, the progressive video field signal P2 corresponds to a second progressive signal, the second progressive video generation circuit 5 corresponds to a second progressive circuit, the first video signal generation circuit 10 corresponds to a first pixel generation circuit, and the second video signal generation circuit 11 corresponds to a second pixel generation circuit.

Furthermore, the comparison circuit 6a corresponds to a motion calculation circuit, the frame interfiled interpolation signal F1 corresponds to a still picture progressive signal, the frame interfiled interpolation circuit 7 corresponds to a still picture processing circuit, the field intra-field interpolation signal F2 corresponds to a moving picture progressive signal, the field intra-field interpolation circuit 8 corresponds to a moving picture processing circuit, and interlaced video signals V1, a, b, and c respectively correspond to first to fourth interlaced video signals.

Third Embodiment

Figure 11:
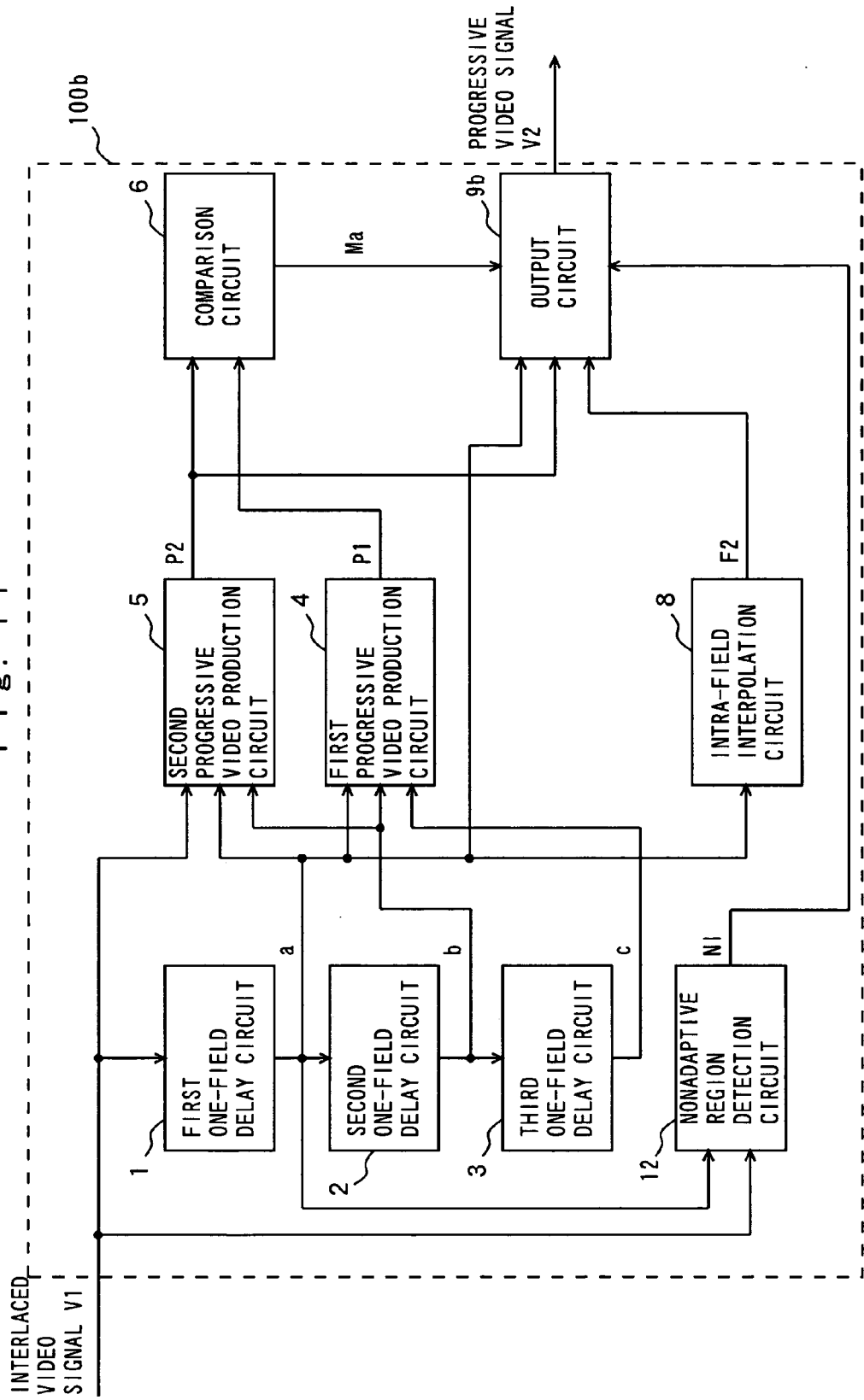
FIG. 11 is a block diagram showing the configuration of a picture conversion apparatus according to a third embodiment.

A picture conversion apparatus 100b according to a third embodiment of the present invention will be described. FIG. 11 is a block diagram showing the configuration of the picture conversion apparatus 100b according to the third embodiment.

The picture conversion apparatus 100b shown in FIG. 11b is the same as the picture conversion apparatus 100 according to the first embodiment shown in FIG. 1 except that the frame interfield interpolation circuit 7 is eliminated, a non-adaptive region detection circuit 12 is added, and an output circuit 9b is included in place of the output circuit 9 and hence, the same constituent elements are assigned to the same reference numerals, and only different constituent elements will be described.

An interlaced video signal V1 and an interlaced video signal a which is an output signal from a first one-field delay circuit 1 are fed to the non-adaptive region detection circuit 12 shown in FIG. 11.

The non-adaptive region detection circuit 12 detects, on the basis of the interlaced video signal V1 and the interlaced video signal a, an average of the values of peripheral pixels including pixels corresponding to a picture between fields in each of the signals.

Generally, when the average value in the interlaced video signal V1 and the average value in the interlaced video signal a greatly differ from each other, it is considered that a fed picture is a picture having flicker properties whose signal value originally greatly changes between fields.

The picture having flicker properties means a picture in a state where the whole thereof flickers, for example, a state where the whole thereof repeatedly changes from white to black for each field. Actually, the picture having flicker properties is formed in a video signal in a case where strobe is continuously flashed in a dark room.

In the picture having flicker properties, when frame interfield interpolation which is still picture processing is performed, the picture quality thereof is distorted. Accordingly, the picture conversion apparatus 100b should output a signal obtained by field intra-field interpolation processing which is moving picture processing.

That is, when the picture having flicker properties which alternates between white and black is subjected to frame interfield interpolation which is still picture processing, interpolation of a pixel in gray which is an intermediate color between white and black is performed. Accordingly, the picture quality of a picture in only white or a picture in only black is distorted.

Consequently, the non-adaptive region detection circuit 12 detects whether or not the fed picture is a picture having flicker properties, and feeds to the output circuit 9b judgment whether or not the signal obtained by field intra-field interpolation processing which is moving picture processing should be outputted.

The output circuit 9b increases the ratio of a signal from a field intra-field interpolation circuit 8 and outputs the signal when the judgment that the signal obtained by field intra-field interpolation processing which is moving picture processing should be outputted is fed from the non-adaptive region detection circuit 12. Consequently, the picture having flicker properties, for example, a video including continuous flashing of a camera can be prevented from being erroneously still processed. Therefore, it is possible to provide a higher-precision picture conversion apparatus 100b.

The non-adaptive region detection circuit 12 detects an average of the values of peripheral pixels including corresponding pixels in fields in the interlaced video signal. As a result, it is possible to provide a higher-precision picture conversion apparatus 100b on a relatively small circuit scale.

In the picture conversion apparatus 100b according to the third embodiment, the frame interfield interpolation circuit 7 shown in FIG. 1 is eliminated, and an output signal of a second progressive video generation circuit 5 is fed to the output circuit 9b in place of an output from the frame interfield interpolation circuit 7. The frame interfield interpolation circuit 7 can be thus eliminated. Therefore, it is possible to provide a low-cost picture conversion apparatus 100b.

ANOTHER EXAMPLE

Figure 12:
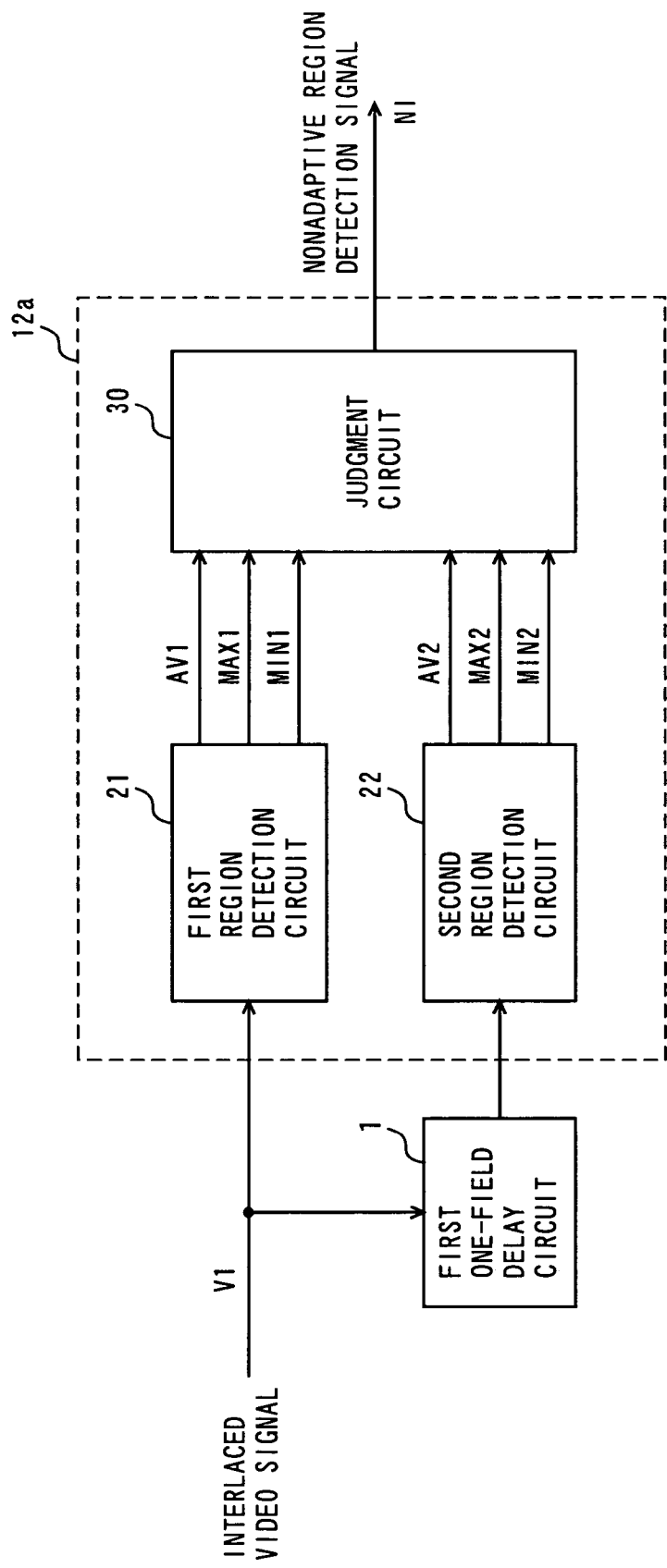
FIG. 12 is a block diagram showing another example of a non-adaptive region detection circuit.

Description is now made of another example of the non-adaptive region detection circuit shown in FIG. 11. FIG. 12 is a block diagram showing another example of the non-adaptive region detection circuit.

A non-adaptive region detection circuit 12a shown in FIG. 12 comprises a first region detection circuit 21, a second region detection circuit 22, and a judgment circuit 30.

As shown in FIG. 12, an interlaced video signal V1 is fed to a first one-field delay circuit 1 and the first region detection circuit 21. The first one-field delay circuit 1 delays the fed interlaced video signal V1 by one field to generate an interlaced video signal a, and feeds the interlaced video signal a to the second region detection circuit 22.

The first region detection circuit 21 feeds to the judgment circuit 30 the average value AV1 on one line, the maximum value MAX1 on one line, and the minimum value MIN1 on one line from the fed interlaced video signal V1. The second region detection circuit 22 feeds to the judgment circuit 30 the average value AV2 on one line, the maximum value MAX2 on one line, and the minimum value MIN2 on one line in the interlaced video signal a fed from the first one-field delay circuit 1.

The judgment circuit 30 detects whether or not a picture fed on the basis of the average values AV1 and AV2, the maximum values MAX1 and MAX2, and the minimum values MIN1 and MIN2 which are fed from the first region detection circuit 21 and the second region detection circuit 22 is a picture having flicker properties whose signal value originally greatly changes between fields.

For example, the judgment circuit 30 judges whether or not the difference between the first average value AV1 and the second average value AV2 is larger than a first threshold value. The judgment circuit 30 then judges whether or not the difference between the first maximum value MAX1 and the first minimum value MIN1 is larger than a second threshold value. Further, the judgment circuit 30 judges whether or not the difference between the second maximum value MAX2 and the second minimum value MIN2 is larger than a third threshold value.

Although the signal value of the picture having flicker properties greatly changes between fields, it does not greatly change in one field.

Therefore, the judgment circuit 30 outputs to the output circuit 9b a non-adaptive region detection signal NI which is judged to be a picture having flicker properties when the difference between the first average value AV1 and the second average value AV2 is larger than the first threshold value, the difference between the first maximum value MAX1 and the first minimum value MIN1 is smaller than the second threshold value, and the difference between the second maximum value MAX2 and the second minimum value MIN2 is smaller than the third threshold value.

The non-adaptive region detection circuit 12a can accurately detect whether or not the fed picture is a picture having flicker properties by thus comparing the respective average values of peripheral pixels including pixels in a video signal delayed by one line and peripheral pixels including pixels on a current line, and feed to the output circuit 9a judgment whether or not a signal obtained by field intra-field interpolation processing which is moving picture processing should be outputted.

The output circuit 9b increases the ratio of a signal from the field intra-field interpolation circuit 8 and outputs the signal when the judgment that the signal obtained by field intra-field interpolation processing which is moving picture processing should be outputted is fed from the non-adaptive region detection circuit 12a. Consequently, the picture having flicker properties, for example, a video including continuous flashing of a camera can be prevented from being erroneously still processed. Therefore, it is possible to provide a higher-precision picture conversion apparatus 100b.

The non-adaptive region detection circuit 12a detects whether or not the fed picture is a picture having flicker properties by an average of the values of peripheral pixels including corresponding pixels in fields in the interlaced video signal. As a result, it is possible to provide a higher-precision picture conversion apparatus 100b on a relatively small circuit scale.

STILL ANOTHER EXAMPLE

Figure 13:
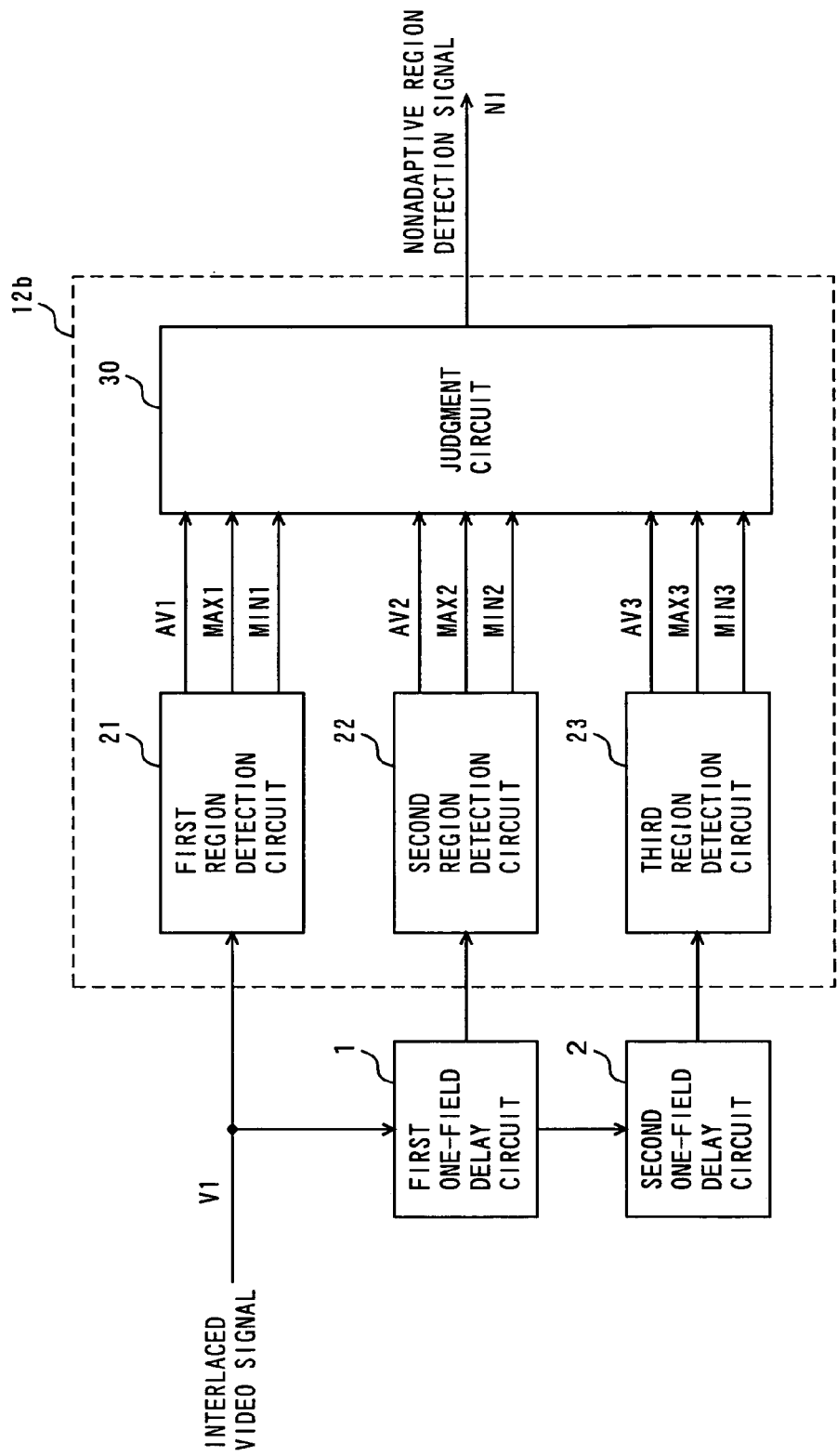
FIG. 13 is a block diagram showing still another example of a non-adaptive region detection circuit.
Figure 14:
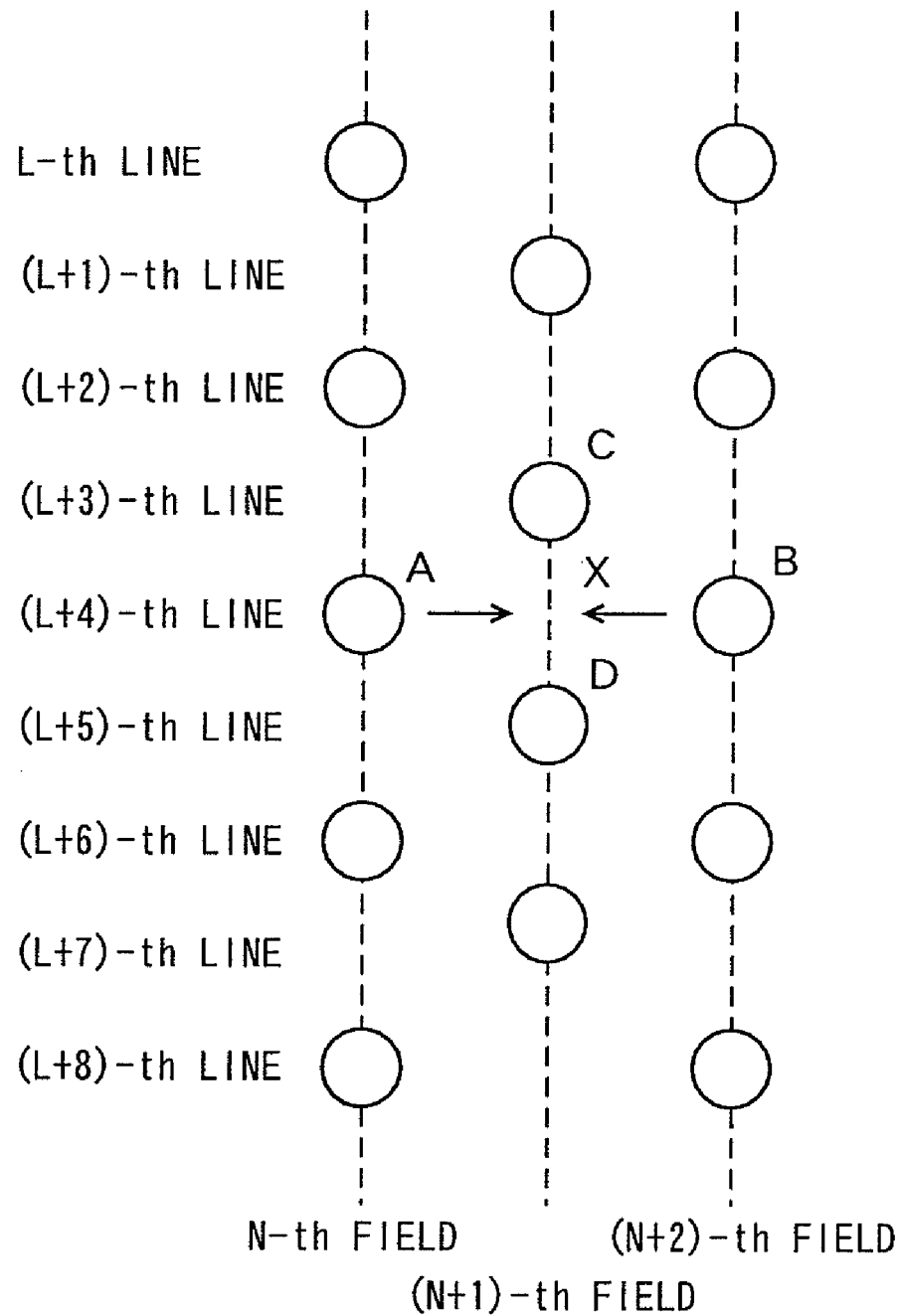
FIG. 14 is a diagram showing the form of an interlaced video signal.
Figure 15:
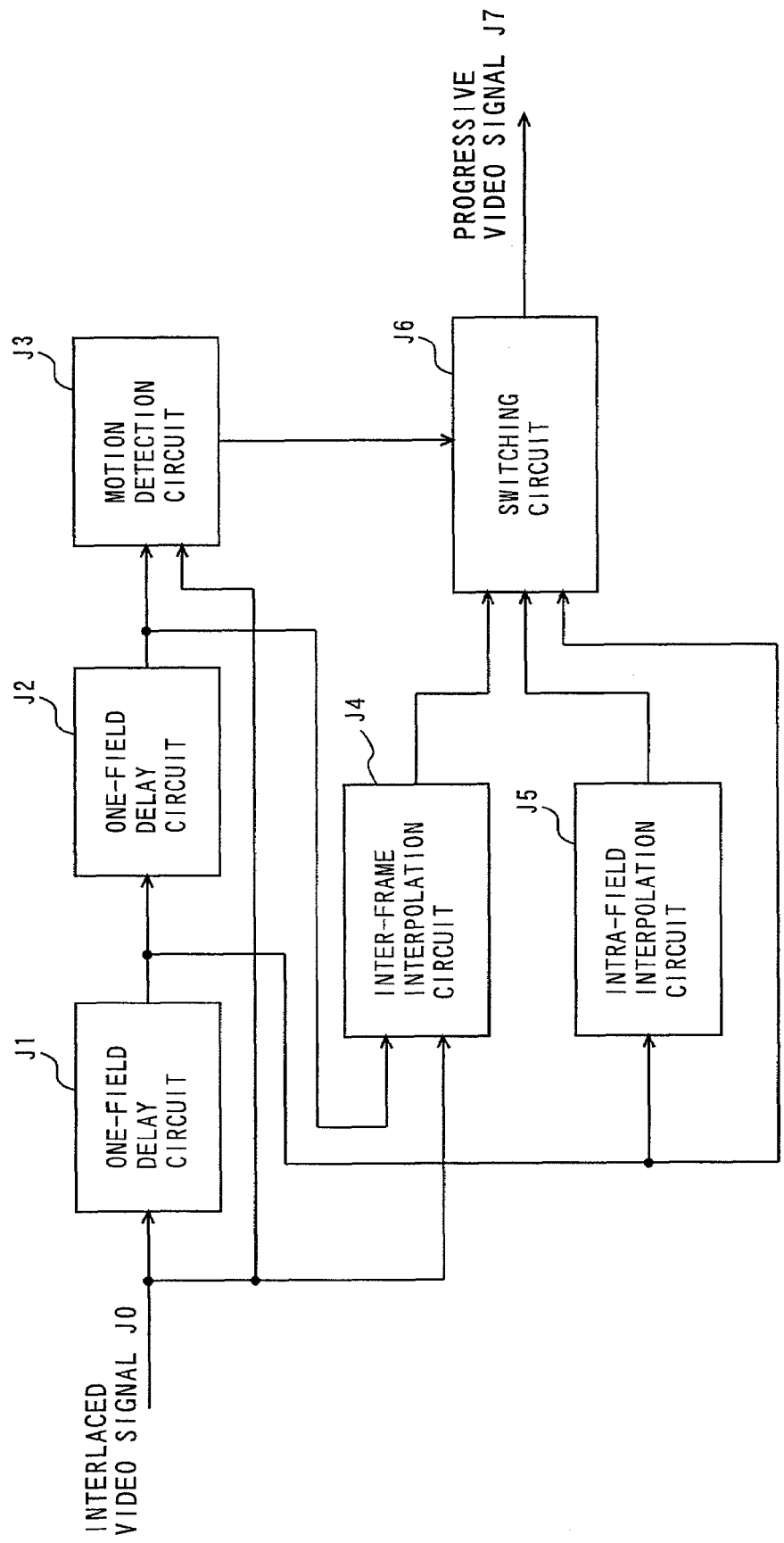
FIG. 15 is a block diagram showing the configuration of a conventional motion adaptive progressive conversion apparatus.

Description is now made of still another example of the non-adaptive region detection circuit shown in FIG. 11. FIG. 13 is a block diagram showing still another example of the non-adaptive region detection circuit.

A non-adaptive region detection circuit 12b shown in FIG. 13 is the same as the non-adaptive region detection circuit 12a shown in FIG. 12 except that a third region detection circuit 23 and a second one-field delay circuit 2 are included in addition to the configuration of the non-adaptive region detection circuit 12a and hence, the same constituent elements are assigned the same reference numerals, and only different constituent elements will be described.

As shown in FIG. 13, a first one-field delay circuit 1 delays a fed interlaced video signal V1 by one field, to generate an interlaced video signal a, and feeds the interlaced video signal a to the second one-field delay circuit 2 and a second region detection circuit 22.

The second one-field delay circuit 2 delays the fed interlaced video signal a by one field to generate an interlaced video signal b, and feeds the interlaced video signal b to the third region detection circuit 23.

The third region detection circuit 23 feeds to a judgment circuit 30 the average value AV3 on one line, the maximum value MAX3 on one line, and the minimum value MIN3 on one line from the fed interlaced video signal b.

The judgment circuit 30 detects whether or not a fed picture is a picture having flicker properties whose signal value originally greatly changes between fields on the basis of the average values AV1, AV2, and AV3, the maximum values MAX1, MAX2, and MAX3, and the minimum values MIN1, MIN2, and MIN3 which are fed from the first region detection circuit 21, the second region detection circuit 22, and the third region detection circuit 23.

Therefore, the judgment circuit 30 judges whether or not the difference between the first average value AV1 and the second average value AV2 is larger than a first threshold value, for example. Further, the judgment circuit 30 further judges whether or not the difference between the second average value AV2 and the third average value AV3 is larger than a fourth threshold value.

The judgment circuit 30 then judges whether or not the difference between the first maximum value MAX1 and the first minimum value MIN1 is larger than a second threshold value. The judgment circuit 30 judges whether or not the difference between the second maximum value MAX2 and the second minimum value MIN2 is larger than a third threshold value. Further, the judgment circuit 30 judges whether or not the difference between the third maximum value MAX2 and the third minimum value MIN2 is larger than a fifth threshold value.

Although the signal value of the picture having flicker properties greatly changes between fields, it does not greatly change in one field.

The judgment circuit 30 outputs to the output circuit 9a a non-adaptive region detection signal NI which is judged to be a picture having flicker properties when the difference between the first average value AV1 and the second average value AV2 is larger than the first threshold value, the difference between the first maximum value MAX1 and the first minimum value MIN1 is smaller than the second threshold value, the difference between the second maximum value MAX2 and the second minimum value MIN2 is smaller than the third threshold value, the difference between the third average value AV3 and the second average value AV2 is smaller than the first threshold value, and the difference between the third maximum value MAX3 and the third minimum value MIN3 is smaller than the fifth threshold value.

Thus, the non-adaptive region detection circuit 12a accurately detects whether or not the fed picture is a picture having flicker properties by comparing the respective average values of peripheral pixels including pixels in a video signal delayed by two lines, peripheral pixels including pixels in a video signal delayed by one line, and peripheral pixels including pixels on a current line, and feed to the output circuit 9b judgment whether or not a signal obtained by field intra-field interpolation processing which is moving picture processing should be outputted.

The output circuit 9b increases the ratio of a signal from the field intra-field interpolation circuit 8 and outputs the signal when the judgment that the signal obtained by field intra-field interpolation processing which is moving picture processing should be outputted is fed from the non-adaptive region detection circuit 12a. Consequently, the picture having flicker properties, for example, a video including continuous flashing of a camera can be prevented from being erroneously still processed. Particularly, it is possible to provide a high-precision picture conversion apparatus 100b.

In the description of the second embodiment of the present invention, the first one-field delay circuit 1, the second one-field delay circuit 2, the third one-field delay circuit 3, the first progressive video generation circuit 4, the second progressive video generation circuit 5, the first video signal generation circuit 10 and the second video signal generation circuit 11 correspond to an interpolation circuit, the first one-field delay circuit 1, the second one-field delay circuit 2, and the third one-field delay circuit 3 correspond to an interlace generation circuit, the progressive video field signal P1 corresponds to a first progressive signal, the first progressive video generation circuit 4 corresponds to a first progressive circuit, the progressive video field signal P2 corresponds to a second progressive signal, the second progressive video generation circuit 5 corresponds to a second progressive circuit, the first video signal generation circuit 10 corresponds to a first pixel generation circuit, the second video signal generation circuit 11 corresponds to a second pixel generation circuit, and the non-adaptive regions 12, 12a, and 12b correspond to a judgment circuit.

Furthermore, the comparison circuit 6 corresponds to a motion calculation circuit, the frame interfiled interpolation signal F1 corresponds to a still picture progressive signal, the frame interfiled interpolation circuit 7 corresponds to a still picture processing circuit, the field intra-field interpolation signal F2 corresponds to a moving picture progressive signal, the field intra-field interpolation circuit 8 corresponds to a moving picture processing circuit, and interlaced video signals V1, a, b, and c respectively correspond to first to fourth interlaced video signals.

The invention claimed is:

1. A picture conversion apparatus that converts an inputted interlaced video signal into a progressive video signal, comprising:
    an interpolation circuit that generates interpolated pixels between lines on the basis of said inputted interlaced video signal;

a motion calculation circuit that calculates motion amount information in a vertical direction of a picture on a basis of said interpolation signal outputted from said interpolation circuit;

a still picture processing circuit that generates a still picture progressive signal by still picture processing from said inputted interlaced video signal;

a moving picture processing circuit that generates a moving picture progressive signal by moving picture processing from said inputted interlaced video signal; and an output circuit that outputs the still picture progressive signal outputted from said still picture processing circuit as said progressive video signal when said motion amount calculated by said motion calculation circuit is smaller than a first value, said interpolation circuit comprising:

an interlace generation circuit that generates a plurality of interlaced video signals respectively corresponding to a plurality of successive fields on the basis of said inputted interlaced video signal;

a first progressive generation circuit that generates a first progressive field signal on the basis of the plurality of interlaced video signals generated by said interlace generation circuit;

a second progressive generation circuit that generates a second progressive field signal on the basis of the plurality of interlaced video signals generated by said interlace generation circuit; and an output circuit that outputs a progressive signal by changing, for each pixel, the ratio of an inter-frame interpolation signal to an intra-field interpolation signal, based on the motion amount information.

2. The picture conversion apparatus according to claim 1, wherein said interpolation circuit includes an interlace generation circuit that generates a plurality of interlaced video signals respectively corresponding to a plurality of successive fields on the basis of said inputted interlaced video signal, a progressive generation circuit that generates a progressive signal on the basis of the plurality of interlaced video signals generated by said interlace generation circuit, and a pixel generation circuit that generates interpolated pixels between lines by interpolation processing using said progressive signal generated by said progressive generation circuit, and outputs an interpolation signal including pixels in said progressive signal and the interpolated pixels, and said motion calculation circuit calculates said motion amount on the basis of said interpolation signal outputted from said pixel generation circuit.

3. The picture conversion apparatus according to claim 2, wherein said first value is a value which is not more than the spacing between lines.

4. The picture conversion apparatus according to claim 2, wherein said motion calculation circuit calculates the motion amount in the vertical direction on the basis of a value smaller than the spacing between lines.

5. The picture conversion apparatus according to claim 2, wherein said progressive generation circuit comprises a first progressive generation circuit that generates a first progressive signal on the basis of a first combination of more than one of the plurality of interlaced video signals generated by said interlace generation circuit, and a second progressive generation circuit that generates a second progressive signal on the basis of a second combination, which differs from said first combination, of more than one of the plurality of interlaced video signals generated by said interlace generation circuit, said pixel generation circuit comprises a first pixel generation circuit that generates interpolated pixels between lines by interpolation processing using said first progressive signal generated by said first progressive generation circuit to output a first interpolation signal including the pixels in said first progressive signal and the interpolated pixels, and a second pixel generation circuit that generates interpolated pixels between lines by interpolation processing using said second progressive signal generated by said second progressive generation circuit to output a second interpolation signal including the pixels in said second progressive signal and the interpolated pixels, and said motion calculation circuit calculates said motion amount on the basis of said first interpolation signal outputted from said first pixel generation circuit and said second interpolation signal outputted from said second pixel generation circuit.

6. The picture conversion apparatus according to claim 2, wherein said output circuit outputs said moving picture progressive signal as said progressive video signal when said motion amount is larger than a second value.

7. The picture conversion apparatus according to claim 6, wherein said output circuit synthesizes, when said motion amount is between said first value and said second value, said moving picture progressive signal and said still picture progressive signal at a ratio based on said motion amount to output the synthesized signal as said progressive video signal.

8. The picture conversion apparatus according to claim 2, wherein said output circuit sets the ratio of said still picture progressive signal to not less than 0.5 when said motion amount is not more than the spacing between lines.

9. The picture conversion apparatus according to claim 2, wherein said output circuit sets the ratio of said still picture progressive signal to not less than 0.5 when said motion amount is not more than 0.75 times the spacing between lines.

10. The picture conversion apparatus according to claim 2, wherein said output circuit sets the ratio of said still picture progressive signal to not less than 0.5 when said motion amount is not more than 0.5 times the spacing between lines.

11. The picture conversion apparatus according to claim 5, wherein said plurality of interlaced video signals include first to fourth interlaced video signals corresponding to successive first to fourth fields, said first combination of more than one of the plurality of interlaced video signals include said first to third interlaced video signals, and said second combination of more than one of the plurality of interlaced video signals include said second to fourth interlaced video signals.

12. The picture conversion apparatus according to claim 2, further comprising a judgment circuit that respectively calculates the averages of the values of object pixels and pixels peripheral thereto in the plurality of interlaced video signals corresponding to the plurality of fields, and judges whether said still picture progressive signal is adaptive or non-adaptive on the basis of said calculated averages, said output circuit outputting the moving picture progressive signal as said progressive video signal when the result of the judgment by said judgment circuit is non-adaptive.

13. The picture conversion apparatus according to claim 12, wherein said judgment circuit respectively calculates the maximums and the minimums of the values of the object pixels and the pixels peripheral thereto in the plurality of interlaced video signals corresponding to said plurality of fields to judge whether said still picture progressive signal is adaptive or non-adaptive on the basis of said calculated averages, maximums, and minimums.

14. The picture conversion apparatus according to claim 12, wherein said judgment circuit judges whether said still picture progressive signal to be non-adaptive when the respective differences between the calculated averages are larger than a predetermined value, and the difference between the maximum and the minimum in the same field is smaller than the predetermined value.

15. A picture conversion method in which an inputted interlaced video signal is converted into a progressive video signal, comprising:

generating interpolated pixels between lines, and outputting an interpolation signal including the interpolated pixels;

calculating motion amount information in a vertical direction of a picture on a basis of the outputted interpolation signal;

generating a still picture progressive signal by still picture processing from said inputted interlaced video signal;

generating a moving picture progressive signal by moving picture processing from said inputted interlaced video signal; and outputting said outputted still picture progressive signal as said progressive video signal when said calculated motion amount is smaller than a first value, wherein generating interpolated pixels between lines comprises:

generating a plurality of interlaced video signals respectively corresponding to a plurality of successive fields on the basis of said inputted interlaced video signal;

generating a first progressive field signal based on the generated plurality of interlaced video signals; and generating a second progressive field signal based on the plurality of interlaced video signals generated by said interlace generation circuit; and outputting a progressive signal by changing, for each pixel, the ratio of an inter-frame interpolation signal to an intra-field interpolation signal, based on the motion amount information.

16. The picture conversion method according to claim 15, wherein said step of generating interpolated pixels includes the steps of generating a plurality of interlaced video signals respectively corresponding to a plurality of successive fields on the basis of said inputted interlaced video signal, generating a progressive signal on the basis of the generated plurality of interlaced video signals, and generating interpolated pixels between lines by interpolation processing using said generated progressive signal, and outputting an interpolation signal including pixels in said progressive signal and the interpolated pixels, and said step of calculating a motion amount includes the step of calculating said motion amount on the basis of the outputted interpolation signal.

* * * * *

UNITED STATES PATENT AND TRADEMARK OFFICE
CERTIFICATE OF CORRECTION

PATENT NO. : 7,446,815 B2 Page 1 of 1
APPLICATION NO. : 10/509677
DATED : November 4, 2008
INVENTOR(S) : M Kasahara et al.

It is certified that error appears in the above-identified patent and that said Letters Patent is hereby corrected as shown below:

On the Title Page, at Item (56), References Cited, Other Publications, page 2, "English Language Abstract of JP 2000-134858" should be -- English Language Abstract JP 2000-134585 --.

Signed and Sealed this

Seventeenth Day of February, 2009

JOHN DOLL
*Acting Director of the United States Patent and Trademark Office*